United States Patent
Han et al.

(10) Patent No.: US 10,721,754 B2
(45) Date of Patent: Jul. 21, 2020

(54) DATA TRANSMISSION METHOD AND APPARATUS

(71) Applicant: HUAWEI TECHNOLOGIES CO., LTD., Shenzhen, Guangdong (CN)

(72) Inventors: Lifeng Han, Shenzhen (CN); Qufang Huang, Shanghai (CN); Qinghai Zeng, Shanghai (CN); Min Huang, Shenzhen (CN); Lingli Pang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/198,720

(22) Filed: Nov. 21, 2018

(65) Prior Publication Data
US 2019/0090257 A1 Mar. 21, 2019

Related U.S. Application Data

(63) Continuation of application No. PCT/CN2016/083198, filed on May 24, 2016.

(51) Int. Cl.
*H04L 1/00* (2006.01)
*H04W 72/12* (2009.01)
(Continued)

(52) U.S. Cl.
CPC ... *H04W 72/1236* (2013.01); *H04W 28/0268* (2013.01); *H04W 28/24* (2013.01); *H04W 72/1242* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2008/0123660 A1* | 5/2008 | Sammour | H04L 47/10 370/395.21 |
| 2013/0007234 A1 | 1/2013 | Bartfai-Walcott et al. | |

(Continued)

FOREIGN PATENT DOCUMENTS

| | | |
|---|---|---|
| CN | 101128040 A | 2/2008 |
| CN | 102638852 A | 8/2012 |
| CN | 103595764 A | 2/2014 |

OTHER PUBLICATIONS

T-REC-H.264-201602-S!!PDF-E,"Series H: Audiovisual and Multimedia Systems Infrastructure of audiovisual services—Coding of moving video-Advanced video coding for generic audiovisual services",ITU-T Telecommunication Standardization Sector of ITU,total 807 pages.

(Continued)

*Primary Examiner* — Clemence S Han
(74) *Attorney, Agent, or Firm* — Womble Bond Dickinson (US) LLP

(57) ABSTRACT

A method includes: obtaining, by a terminal, to-be-transmitted uplink service data of a preset granularity; obtaining, by the terminal, a QoS requirement parameter corresponding to the to-be-transmitted uplink service data of the preset granularity; and transmitting, by the terminal, the to-be-transmitted uplink service data of the preset granularity based on the QoS requirement parameter corresponding to the to-be-transmitted uplink service data of the preset granularity. Different data processing is implemented for to-be-transmitted uplink service data of preset granularities corresponding to different QoS requirement parameters, so that QoS requirements of uplink service data of different preset granularities are satisfied.

20 Claims, 10 Drawing Sheets

(51) Int. Cl.
*H04W 28/02* (2009.01)
*H04W 28/24* (2009.01)

(56) References Cited

U.S. PATENT DOCUMENTS

| | | | |
|---|---|---|---|
| 2014/0056245 A1 | 2/2014 | Qin et al. | |
| 2015/0229970 A1* | 8/2015 | Ma | H04L 47/20 370/260 |
| 2015/0358111 A1* | 12/2015 | Marinier | H04L 1/0026 370/329 |
| 2016/0112896 A1* | 4/2016 | Karampatsis | H04W 28/0252 370/230.1 |

OTHER PUBLICATIONS

European Patent EP16902667.1 Supplementary European Search Report, dated Feb. 20, 2019, total 16 pages.

* cited by examiner

DATA TRANSMISSION METHOD AND APPARATUS

CROSS-REFERENCE TO RELATED APPLICATIONS

This application is a continuation of International Application No. PCT/CN2016/083198, filed on May 24, 2016, the disclosure of which is hereby incorporated by reference in its entirety.

TECHNICAL FIELD

The present disclosure relates to wireless communications technologies, and in particular, to a data transmission method and apparatus.

BACKGROUND

Quality of service (QoS) is a capability of a network to provide a better service for network communication by using various fundamental technologies, and is a network security mechanism used to resolve problems such as a network delay and congestion.

In an uplink transmission process of a Long Term Evolution (LTE) system, a terminal binds a service data flow (SDF) of a user to an evolved packet system (EPS) bearer by using an uplink (UL) traffic flow template (TFT), and can multiplex a plurality of SDFs to the same EPS bearer by adding a plurality of uplink packet filters to the UL TFT. In a downlink transmission process of the LTE system, a packet data network gateway (P-GW) in a core network binds an SDF to an EPS bearer by using a downlink (DL) TFT, and can multiplex a plurality of SDFs to the same EPS bearer by adding a plurality of downlink packet filters to the DL TFT.

In the existing LTE system, a QoS requirement is ensured by using an attribute of an EPS bearer. Specifically, a mobility management entity (MME) in the core network provides an evolved radio access bearer (E-RAB) QoS requirement parameter for a wireless network side. Specifically, the E-RAB QoS requirement parameter may include a QoS class identifier (QCI). Different QCIs identify different QoS requirements. In addition, the wireless network side considers that QoS requirements of a plurality of SDFs multiplexed to a same EPS bearer are the same, and uses QoS processing on a same level. However, QoS requirements of different services are actually not the same. Different QoS requirements of different services cannot be satisfied by using the prior art.

SUMMARY

Embodiments of the present disclosure provide a data transmission method and apparatus to resolve a problem that different QoS requirements of different services cannot be satisfied in the prior art.

A first aspect of the present disclosure provides a data transmission method, including:

obtaining, by a radio access network network element, service data of a preset granularity;

obtaining, by the radio access network network element, a QoS requirement parameter corresponding to the service data of the preset granularity;

performing, by the radio access network network element, QoS requirement classification on the service data of the preset granularity, and determining, based on the QoS requirement parameter corresponding to the service data of the preset granularity, a QoS requirement parameter corresponding to a class of the service data of the preset granularity; and transmitting, by the radio access network network element, the service data of the preset granularity based on the class of the service data of the preset granularity.

Optionally, the obtaining, by the radio access network network element, a QoS requirement parameter corresponding to the service data of the preset granularity includes:

obtaining, by the radio access network network element based on attribute information of the service data of the preset granularity and a preset quality of service (QoS) mapping relationship, the QoS requirement parameter corresponding to the service data of the preset granularity.

Optionally, the attribute information of the service data of the preset granularity includes any one of the following or any combination thereof: preset feature information, a preset identifier, and a preset channel identifier.

Optionally, the preset QoS mapping relationship is a preset mapping relationship between feature information and a QoS requirement parameter; and the obtaining, by the radio access network network element based on attribute information of the service data of the preset granularity and a preset quality of service (QoS) mapping relationship, the QoS requirement parameter corresponding to the service data of the preset granularity includes:

recognizing, by the radio access network network element, feature information of the service data of the preset granularity; and obtaining, by the radio access network network element based on the feature information of the service data of the preset granularity and the preset mapping relationship between the feature information and the QoS requirement parameter, the QoS requirement parameter corresponding to the service data of the preset granularity.

Further, the feature information includes one of the following or any combination thereof: a protocol layer port number, a feature field, an associated feature, and data flow behavior, where the associated feature indicates a plurality of feature fields that are jointly recognized.

Optionally, the preset quality of service (QoS) mapping relationship is a preset mapping relationship between a QoS identifier and a QoS requirement parameter; and the obtaining, by the radio access network network element based on attribute information of the service data of the preset granularity and a preset quality of service (QoS) mapping relationship, the QoS requirement parameter corresponding to the service data of the preset granularity includes:

obtaining, by the radio access network network element, a QoS identifier in the service data of the preset granularity based on a preset rule; and obtaining, by the radio access network network element based on the QoS identifier in the service data of the preset granularity and the preset mapping relationship between the QoS identifier and the QoS requirement parameter, the QoS requirement parameter corresponding to the service data of the preset granularity.

Further, the obtaining, by the radio access network network element, a QoS identifier in the service data of the preset granularity based on a preset rule includes:

obtaining, by the radio access network network element, the QoS identifier from a header of a data packet of the service data of the preset granularity based on the preset rule.

Optionally, the preset quality of service (QoS) mapping relationship is a preset mapping relationship between a channel identifier and a QoS requirement parameter; and the obtaining, by the radio access network network element based on attribute information of the service data of the preset granularity and a preset quality of service (QoS) mapping relationship, the QoS requirement parameter corresponding to the service data of the preset granularity includes:

determining, by the radio access network network element, a channel for receiving the service data of the preset granularity; and obtaining, by the radio access network network element based on the channel for receiving the service data of the preset granularity and the preset mapping relationship between the channel identifier and the QoS requirement parameter, the QoS requirement parameter corresponding to the service data of the preset granularity.

Further, the QoS requirement parameter includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, before the obtaining, by the radio access network network element, a QoS requirement parameter corresponding to the service data of the preset granularity, the method further includes:

obtaining, by the radio access network network element, enhanced QoS attribute information; and correspondingly, the obtaining, by the radio access network network element, a QoS requirement parameter corresponding to the service data of the preset granularity includes:

obtaining, by the radio access network network element based on enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, when the enhanced QoS attribute information includes the time-varying attribute, the preset QoS mapping relationship includes a mapping relationship between the status of the service data and the QoS requirement parameter; and the obtaining, by the radio access network network element based on enhanced QoS attribute information of the service data of the preset granularity and the preset QoS mapping relationship, the QoS requirement parameter corresponding to the service data of the preset granularity includes:

obtaining, by the radio access network network element, a current service status of the service data of the preset granularity; and determining, by the radio access network network element based on the current service status of the service data of the preset granularity and the mapping relationship between the status of the service data and the QoS requirement parameter, a QoS requirement parameter corresponding to the current service status of the service data of the preset granularity.

Optionally, the obtaining, by the radio access network network element, a current service status of the service data of the preset granularity includes:

receiving, by the radio access network network element, a service status change notification sent by an application layer server; and determining, by the radio access network network element, the current service status of the service data of the preset granularity based on the service status change notification.

Optionally, the transmitting, by the radio access network network element, the service data of the preset granularity based on the class of the service data of the preset granularity includes:

using, by the radio access network network element, the QoS requirement parameter corresponding to the class of the service data of the preset granularity as an input for Medium Access Control MAC layer scheduling, and transmitting the service data of the preset granularity through MAC layer scheduling.

Optionally, before the transmitting, by the radio access network network element, the service data of the preset granularity based on the class of the service data of the preset granularity, the method further includes:

generating, by the radio access network network element, a plurality of sub radio bearers (RBs), where each sub radio bearer corresponds to different QoS requirement parameters; and the transmitting, by the radio access network network element, the service data of the preset granularity based on the class of the service data of the preset granularity includes:

selecting, by the radio access network network element based on the QoS requirement parameter corresponding to the class of the service data of the preset granularity and a mapping relationship between a sub radio bearer and a QoS requirement parameter, a corresponding sub radio bearer for transmitting the service data of the preset granularity.

Optionally, the transmitting, by the radio access network network element, the service data of the preset granularity based on the class of the service data of the preset granularity includes:

selecting, by the radio access network network element based on the QoS requirement parameter corresponding to the class of the service data of the preset granularity, a processing template used by each protocol layer, where different processing templates correspond to different QoS requirement parameters; and transmitting, by the radio access network network element, the service data of the preset granularity based on the processing template used by each protocol layer.

Further, the method further includes:

obtaining, by the radio access network network element, the preset QoS mapping relationship.

Further, the method further includes:

sending, by the radio access network network element, the preset QoS mapping relationship to a terminal.

A second aspect of the embodiments of the present disclosure provides a data transmission method, including:

obtaining, by a terminal, to-be-transmitted uplink service data of a preset granularity;

obtaining, by the terminal, a QoS requirement parameter corresponding to the to-be-transmitted uplink service data of the preset granularity; and transmitting, by the terminal, the to-be-transmitted uplink service data of the preset granularity based on the QoS requirement parameter corresponding to the to-be-transmitted uplink service data of the preset granularity.

Optionally, the obtaining, by the terminal, a QoS requirement parameter corresponding to the to-be-transmitted uplink service data of the preset granularity includes:

obtaining, by the terminal based on the to-be-transmitted uplink service data of the preset granularity and a preset quality of service (QoS) mapping relationship, the QoS requirement parameter corresponding to the to-be-transmitted uplink service data of the preset granularity.

Further, the preset quality of service (QoS) mapping relationship is a preset mapping relationship between feature information and a QoS requirement parameter; and the obtaining, by the terminal based on the to-be-transmitted uplink service data of the preset granularity and a preset QoS mapping relationship, the QoS requirement parameter corresponding to the to-be-transmitted uplink service data of the preset granularity includes:

recognizing, by the terminal, feature information of the to-be-transmitted uplink service data of the preset granularity; and obtaining, by the terminal based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset QoS mapping relationship is a preset mapping relationship between a QoS identifier and a QoS requirement parameter; and the obtaining, by the terminal based on the to-be-transmitted uplink service data of the preset granularity and a preset quality of service (QoS) mapping relationship, the QoS requirement parameter corresponding to the to-be-transmitted uplink service data of the preset granularity includes:

obtaining, by the terminal, a QoS identifier in the to-be-transmitted uplink service data of the preset granularity; and obtaining, by the terminal based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Further, the QoS requirement parameter includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, before the obtaining, by the terminal, a QoS requirement parameter corresponding to the to-be-transmitted uplink service data of the preset granularity, the method further includes:

receiving, by the terminal, enhanced QoS attribute information sent by a core network control function entity or a RAN network element; and correspondingly, the obtaining, by the terminal, a QoS requirement parameter corresponding to the to-be-transmitted uplink service data of the preset granularity includes:

obtaining, by the terminal based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

Further, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, the transmitting, by the terminal, the to-be-transmitted uplink service data of the preset granularity based on the QoS requirement parameter corresponding to the to-be-transmitted uplink service data of the preset granularity includes:

adjusting, by the terminal based on the QoS requirement parameter corresponding to the to-be-transmitted uplink service data of the preset granularity, a scheduling policy of a logical channel corresponding to the to-be-transmitted uplink service data of the preset granularity, and transmitting the to-be-transmitted uplink service data of the preset granularity to a RAN network element by using the adjusted logical channel.

Optionally, the transmitting, by the terminal, the to-be-transmitted uplink service data of the preset granularity based on the QoS requirement parameter corresponding to the to-be-transmitted uplink service data of the preset granularity includes:

mapping, by the terminal based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission.

Optionally, before the mapping, by the terminal based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission, the method further includes:

receiving, by the terminal, the preset mapping relationship between the QoS requirement parameter and the sub RB that is sent by the RAN network element.

Optionally, the transmitting, by the terminal, the to-be-transmitted uplink service data of the preset granularity based on the QoS requirement parameter corresponding to the to-be-transmitted uplink service data of the preset granularity includes:

transmitting, by the terminal, the to-be-transmitted uplink service data of the preset granularity by using a preset processing template corresponding to each protocol layer, where different processing templates correspond to different QoS requirement parameters.

A third aspect of the embodiments of the present disclosure provides a data transmission method, including:

generating, by a core network control function entity CN CP, a quality of service (QoS) mapping relationship, where the QoS mapping relationship is used to indicate a mapping relationship between service data of a preset granularity and a QoS requirement parameter; and sending, by the CN CP, the QoS mapping relationship to a radio access network network element.

Optionally, the method further includes:

sending, by the CN CP, the QoS mapping relationship to a terminal.

Optionally, the QoS mapping relationship includes a mapping relationship between service data feature information and a QoS requirement parameter.

Optionally, the feature information includes one of the following or any combination thereof: a protocol layer port number, a feature field, an associated feature, and data flow behavior, where the associated feature indicates a plurality of feature fields that are jointly recognized.

Optionally, the QoS mapping relationship includes a mapping relationship between a QoS identifier in service data and a QoS requirement parameter.

Optionally, the preset quality of service (QoS) mapping relationship is a preset mapping relationship between a channel identifier and a QoS requirement parameter.

Further, the method further includes:

sending, by the CN CP, at least one set of QoS requirement parameters to a core network user plane function entity.

A fourth aspect of the embodiments of the present disclosure provides a data transmission apparatus, including:

an obtaining module, configured to obtain service data of a preset granularity;

a determining module, configured to obtain a QoS requirement parameter corresponding to the service data of the preset granularity, perform QoS requirement classification on the service data of the preset granularity, and determine, based on the QoS requirement parameter corresponding to the service data of the preset granularity, a QoS requirement parameter corresponding to a class of the service data of the preset granularity; and a transmission module, configured to transmit the service data of the preset granularity based on the class of the service data of the preset granularity.

Optionally, the determining module is specifically configured to obtain, based on attribute information of the service data of the preset granularity and a preset quality of service (QoS) mapping relationship, the QoS requirement parameter corresponding to the service data of the preset granularity.

The attribute information of the service data of the preset granularity includes any one of the following or any combination thereof: preset feature information, a preset identifier, and a preset channel identifier.

Optionally, the preset quality of service (QoS) mapping relationship is a preset mapping relationship between feature information and a QoS requirement parameter; and the determining module is specifically configured to recognize feature information of the service data of the preset granularity, and obtain, based on the feature information of the service data of the preset granularity and the preset mapping relationship between the feature information and the QoS requirement parameter, the QoS requirement parameter corresponding to the service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset quality of service (QoS) mapping relationship is a preset mapping relationship between a QoS identifier and a QoS requirement parameter; and the determining module is specifically configured to obtain a QoS identifier in the service data of the preset granularity based on a preset rule, and obtain, based on the QoS identifier in the service data of the preset granularity and the preset mapping relationship between the QoS identifier and the QoS requirement parameter, the QoS requirement parameter corresponding to the service data of the preset granularity.

Optionally, that the determining module is configured to obtain a QoS identifier in the service data of the preset granularity based on a preset rule is specifically: obtaining the QoS identifier from a header of a data packet of the service data of the preset granularity based on the preset rule.

Optionally, the preset quality of service (QoS) mapping relationship is a preset mapping relationship between a channel identifier and a QoS requirement parameter; and the determining module is specifically configured to determine a channel for receiving the service data of the preset granularity, and obtain, based on the channel for receiving the service data of the preset granularity and the preset mapping relationship between the channel identifier and the QoS requirement parameter, the QoS requirement parameter corresponding to the service data of the preset granularity.

Optionally, the QoS requirement includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the apparatus further includes:

a receiving module, configured to receive and obtain enhanced QoS attribute information; and the determining module is specifically configured to obtain, based on enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, when the enhanced QoS attribute information includes the time-varying attribute, the preset QoS mapping relationship includes a mapping relationship between the status of the service data and the QoS requirement parameter; and the determining module is specifically configured to obtain a current service status of the service data of the preset granularity, and determine, based on the current service status of the service data of the preset granularity and the mapping relationship between the status of the service data and the QoS requirement parameter, a QoS requirement parameter corresponding to the current service status of the service data of the preset granularity.

Optionally, the receiving module is further configured to receive a service status change notification sent by an application layer server; and the determining module is further configured to determine the current service status of the service data of the preset granularity based on the service status change notification.

Optionally, the transmission module is specifically configured to use the QoS requirement parameter corresponding to the class of the service data of the preset granularity as an input for Medium Access Control MAC layer scheduling, and transmit the service data of the preset granularity through MAC layer scheduling.

Further, the apparatus further includes:

a generation module, configured to generate a plurality of sub radio bearers, where each sub radio bearer corresponds to different QoS requirement parameters; and correspondingly, the transmission module is specifically configured to select, based on the QoS requirement parameter corresponding to the class of the service data of the preset granularity and a mapping relationship between a sub radio bearer and a QoS requirement parameter, a corresponding sub radio bearer for transmitting the service data of the preset granularity.

Optionally, the transmission module is specifically configured to select, based on the QoS requirement parameter corresponding to the class of the service data of the preset granularity, a processing template used by each protocol layer, where different processing templates correspond to different QoS requirement parameters; and transmit the service data of the preset granularity based on the processing template used by each protocol layer.

Optionally, the obtaining module is further configured to obtain the preset QoS mapping relationship.

Optionally, the transmission module is further configured to send the preset QoS mapping relationship to a terminal.

A fifth aspect of the embodiments of the present disclosure provides a data transmission apparatus, including:

an obtaining module, configured to obtain to-be-transmitted uplink service data of a preset granularity;

a determining module, configured to obtain a QoS requirement parameter corresponding to the to-be-transmitted uplink service data of the preset granularity; and a transmission module, configured to transmit the to-be-transmitted uplink service data of the preset granularity based on the QoS requirement parameter corresponding to the to-be-transmitted uplink service data of the preset granularity.

Optionally, the determining module is specifically configured to obtain, based on the to-be-transmitted uplink service data of the preset granularity and a preset quality of service (QoS) mapping relationship, the QoS requirement parameter corresponding to the to-be-transmitted uplink service data of the preset granularity.

Optionally, the preset quality of service (QoS) mapping relationship is a preset mapping relationship between feature information and a QoS requirement parameter; and the determining module is specifically configured to recognize feature information of the to-be-transmitted uplink service data of the preset granularity, and obtain, based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset QoS mapping relationship is a preset mapping relationship between a QoS identifier and a QoS requirement parameter; and the determining module is specifically configured to obtain a QoS identifier in the to-be-transmitted uplink service data of the preset granularity, and obtain, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Optionally, the QoS requirement includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the apparatus further includes a first receiving module, configured to receive enhanced QoS attribute information sent by a core network control function entity or a RAN network element; and correspondingly, the determining module is specifically configured to obtain, based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, the transmission module is specifically configured to adjust, based on the QoS requirement parameter corresponding to the to-be-transmitted uplink service data of the preset granularity, a scheduling policy of a logical channel corresponding to the to-be-transmitted uplink service data of the preset granularity, and transmit the to-be-transmitted uplink service data of the preset granularity to a RAN network element by using the adjusted logical channel.

Optionally, the transmission module is specifically configured to map, based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission.

Further, the apparatus further includes a second receiving module, configured to receive the preset mapping relationship between the QoS requirement and the sub RB that is sent by the RAN network element.

Optionally, the transmission module is specifically configured to perform QoS processing on the to-be-transmitted uplink service data of the preset granularity by using a preset processing template corresponding to each protocol layer, and send the processed to-be-transmitted uplink service data of the preset granularity to a RAN network element.

A sixth aspect of the embodiments of the present disclosure provides a data transmission apparatus, including:

a generation module, configured to generate a quality of service (QoS) mapping relationship, where the QoS mapping relationship is used to indicate a mapping relationship between service data of a preset granularity and a QoS requirement parameter; and a sending module, configured to send the QoS mapping relationship to a radio access network network element.

Optionally, the sending module is further configured to send the QoS mapping relationship to a terminal.

Optionally, the QoS mapping relationship includes a mapping relationship between service data feature information and a QoS requirement.

Optionally, the service data feature information includes one of the following or any combination thereof: a protocol layer port number, a feature field, an associated feature, and data flow behavior, where the associated feature indicates a plurality of feature fields that are jointly recognized.

Optionally, the QoS mapping relationship includes a mapping relationship between a QoS identifier in service data and a QoS requirement parameter.

Optionally, the preset quality of service (QoS) mapping relationship is a preset mapping relationship between a channel identifier and a QoS requirement parameter.

Optionally, the sending module is further configured to send at least one set of QoS requirement parameters to a core network user plane function entity.

A seventh aspect of the embodiments of the present disclosure provides a data transmission apparatus, including a memory, a processor, a receiver, and a transmitter, where the memory, the processor, the receiver, and the transmitter are connected by a bus.

The processor is configured to obtain service data of a preset granularity, obtain a QoS requirement parameter corresponding to the service data of the preset granularity, perform QoS requirement classification on the service data of the preset granularity, determine, based on the QoS requirement parameter corresponding to the service data of the preset granularity, a QoS requirement parameter corresponding to a class of the service data of the preset granularity, and transmit the service data of the preset granularity based on the class of the service data of the preset granularity.

Optionally, the processor is specifically configured to obtain, based on attribute information of the service data of the preset granularity and a preset quality of service (QoS) mapping relationship, the QoS requirement parameter corresponding to the service data of the preset granularity.

The attribute information of the service data of the preset granularity includes any one of the following or any combination thereof: preset feature information, a preset identifier, and a preset channel identifier.

Optionally, the preset quality of service (QoS) mapping relationship is a preset mapping relationship between feature information and a QoS requirement parameter; and the processor is specifically configured to recognize feature information of the service data of the preset granularity, and obtain, based on the feature information of the service data of the preset granularity and the preset mapping relationship between the feature information and the QoS requirement parameter, the QoS requirement parameter corresponding to the service data of the preset granularity.

The feature information includes one of the following or any combination thereof: a protocol layer port number, a feature field, an associated feature, and data flow behavior, where the associated feature indicates a plurality of feature fields that are jointly recognized.

Optionally, the preset quality of service (QoS) mapping relationship is a preset mapping relationship between a QoS identifier and a QoS requirement parameter; and the processor is specifically configured to obtain a QoS identifier in the service data of the preset granularity based on a preset rule, and obtain, based on the QoS identifier in the service data of the preset granularity and the preset mapping relationship between the QoS identifier and the QoS requirement parameter, the QoS requirement parameter corresponding to the service data of the preset granularity.

Optionally, that the processor is configured to obtain a QoS identifier in the service data of the preset granularity based on a preset rule is specifically: obtaining the QoS identifier from a header of a data packet of the service data of the preset granularity based on the preset rule.

Optionally, the preset quality of service (QoS) mapping relationship is a preset mapping relationship between a channel identifier and a QoS requirement parameter; and the processor is specifically configured to determine a channel for receiving the service data of the preset granularity, and obtain, based on the channel for receiving the service data of the preset granularity and the preset mapping relationship between the channel identifier and the QoS requirement parameter, the QoS requirement parameter corresponding to the service data of the preset granularity.

Optionally, the QoS requirement includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the receiver is configured to receive and obtain enhanced QoS attribute information; and the processor is specifically configured to obtain, based on enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, when the enhanced QoS attribute information includes the time-varying attribute, the preset QoS mapping relationship includes a mapping relationship between the status of the service data and the QoS requirement parameter; and the processor is specifically configured to obtain a current service status of the service data of the preset granularity, and determine, based on the current service status of the service data of the preset granularity and the mapping relationship between the status of the service data and the QoS requirement parameter, a QoS requirement parameter corresponding to the current service status of the service data of the preset granularity.

Optionally, the receiver is further configured to receive a service status change notification sent by an application layer server; and the processor is further configured to determine the current service status of the service data of the preset granularity based on the service status change notification.

Optionally, the processor is specifically configured to use the QoS requirement parameter corresponding to the class of the service data of the preset granularity as an input for Medium Access Control MAC layer scheduling, and transmit the service data of the preset granularity through MAC layer scheduling.

Optionally, the processor is further configured to generate a plurality of sub radio bearers, where each sub radio bearer corresponds to different QoS requirement parameters; and select, based on the QoS requirement parameter corresponding to the class of the service data of the preset granularity and a mapping relationship between a sub radio bearer and a QoS requirement parameter, a corresponding sub radio bearer for transmitting the service data of the preset granularity.

Optionally, the processor is specifically configured to select, based on the QoS requirement parameter corresponding to the class of the service data of the preset granularity, a processing template used by each protocol layer, where different processing templates correspond to different QoS requirement parameters; and transmit the service data of the preset granularity based on the processing template used by each protocol layer.

Optionally, the processor is further configured to obtain the preset QoS mapping relationship.

Optionally, the transmitter is configured to send the preset QoS mapping relationship to a terminal.

An eighth aspect of the embodiments of the present disclosure provides a data transmission apparatus, including a memory, a processor, a receiver, and a transmitter, where the memory, the processor, the receiver, and the transmitter are connected by a bus.

The processor is configured to obtain to-be-transmitted uplink service data of a preset granularity, obtain a QoS requirement parameter corresponding to the to-be-transmitted uplink service data of the preset granularity, and transmit the to-be-transmitted uplink service data of the preset granularity based on the QoS requirement parameter corresponding to the to-be-transmitted uplink service data of the preset granularity.

Optionally, the processor is specifically configured to obtain, based on the to-be-transmitted uplink service data of the preset granularity and a preset quality of service (QoS) mapping relationship, the QoS requirement parameter corresponding to the to-be-transmitted uplink service data of the preset granularity.

Optionally, the preset quality of service (QoS) mapping relationship is a preset mapping relationship between feature information and a QoS requirement parameter; and the processor is specifically configured to recognize feature information of the to-be-transmitted uplink service data of the preset granularity, and obtain, based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset QoS mapping relationship is a preset mapping relationship between a QoS identifier and a QoS requirement parameter; and the processor is specifically configured to obtain a QoS identifier in the to-be-transmitted uplink service data of the preset granularity, and obtain, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Further, the QoS requirement parameter includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the receiver is configured to receive enhanced QoS attribute information sent by a core network control function entity or a RAN network element; and the processor is specifically configured to obtain, based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, the processor adjusts, based on the QoS requirement parameter corresponding to the to-be-transmitted uplink service data of the preset granularity, a scheduling policy of a logical channel corresponding to the to-be-transmitted uplink service data of the preset granularity, and transmits the to-be-transmitted uplink service data of the preset granularity to a RAN network element by using the adjusted logical channel.

Optionally, the processor is specifically configured to map, based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission.

Optionally, the receiver is configured to receive the preset mapping relationship between the QoS requirement and the sub RB that is sent by the RAN network element.

Optionally, the processor is specifically configured to perform QoS processing on the to-be-transmitted uplink service data of the preset granularity by using a preset processing template corresponding to each protocol layer, and send the processed to-be-transmitted uplink service data of the preset granularity to a RAN network element.

A ninth aspect of the embodiments of the present disclosure provides a data transmission apparatus, including a memory, a processor, a receiver, and a transmitter, where the memory, the processor, the receiver, and the transmitter are connected by a bus.

The processor is configured to generate a quality of service (QoS) mapping relationship, where the QoS mapping relationship is used to indicate a mapping relationship between service data of a preset granularity and a QoS requirement parameter; and the transmitter is configured to send the QoS mapping relationship to a radio access network network element.

Optionally, the transmitter is further configured to send the QoS mapping relationship to a terminal.

Optionally, the QoS mapping relationship includes a mapping relationship between service data feature information and a QoS requirement.

Optionally, the feature information includes one of the following or any combination thereof: a protocol layer port number, a feature field, an associated feature, and data flow behavior, where the associated feature indicates a plurality of feature fields that are jointly recognized.

Optionally, the QoS mapping relationship includes a mapping relationship between a QoS identifier in service data and a QoS requirement parameter.

Optionally, the preset quality of service (QoS) mapping relationship is a preset mapping relationship between a channel identifier and a QoS requirement parameter.

Optionally, the transmitter is further configured to send at least one set of QoS requirement parameters to a core network user plane function entity.

In the data transmission method and apparatus provided by the embodiments of the present disclosure, the RAN network element obtains the service data of the preset granularity; further, the RAN network element obtains the QoS requirement parameter corresponding to the service data of the preset granularity, performs QoS requirement classification on the service data of the preset granularity, and determines the QoS requirement parameter corresponding to the class of the service data of the preset granularity; and further, the RAN network element transmits the service data of the preset granularity based on the class of the service data of the preset granularity. Therefore, the RAN network element can learn different QoS requirement parameters corresponding to service data of different preset granularities, and transmit the service data of the preset granularities separately based on classes of the service data of the preset granularities, to satisfy QoS requirements of the service data of different preset granularities.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show some embodiments of the present disclosure, and persons of ordinary skill in the art may derive other drawings from these accompanying drawings without creative efforts.

DESCRIPTION OF EMBODIMENTS

A terminal in embodiments of the present disclosure may be a wireless terminal, or may be a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device (or User Equipment). The present disclosure is not limited thereto.

Figure 1:
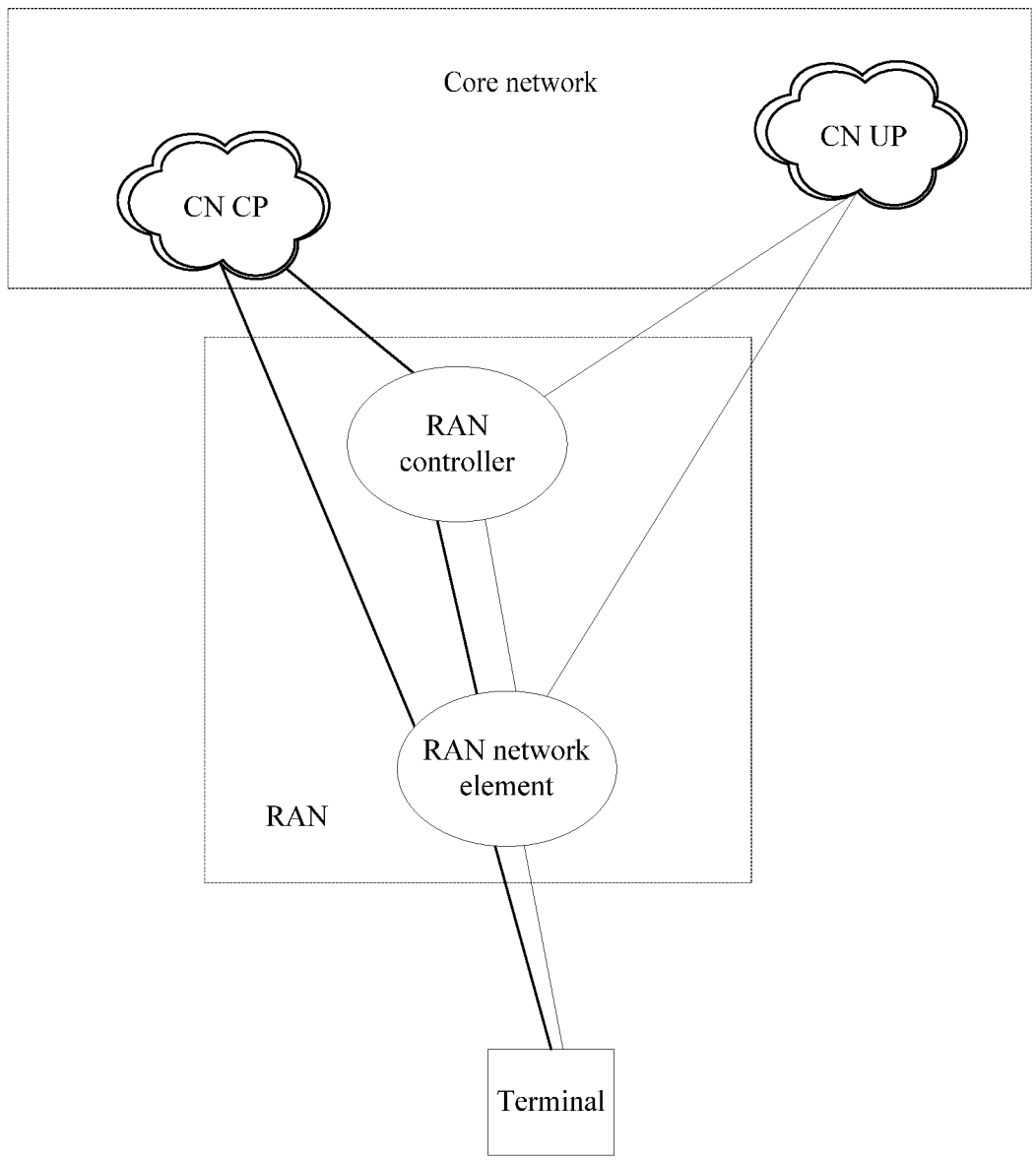
FIG. 1 is a schematic diagram of an application scenario of a data transmission method according to the present disclosure.

FIG. 1 is a schematic diagram of an application scenario of a data transmission method according to the present disclosure. The method is applied to a communications system, where the communications system may be an LTE system, or may be a next-generation communications system, or the like. This is not limited herein. As shown in FIG. 1, the system may include a core network (CN), a radio access network (RAN), and a terminal.

Network elements of the core network may include a core network control plane (CN CP) function entity and a core network user plane (CN UP) function entity.

Optionally, referring to FIG. 1, the RAN includes a RAN network element, and may further include a RAN controller, depending on a specific situation. The RAN controller is not required in every scenario.

If the communications system shown in FIG. 1 is an LTE system, the core network may include network elements such as a mobility management entity (MME), a packet data network gateway (P-GW), and a serving gateway (S-GW).

It should be noted that the CN CP may be further communicatively connected to an application layer server.

In addition, the system to which this embodiment of the present disclosure is applied may further include some auxiliary entities, for example, an HSS, an OAM, and a PCRF.

The foregoing entities are all independent logically, and may be all independent in physical deployment, or some entities are deployed in a same physical location. This is not limited herein.

Referring to FIG. 1, among network elements used in this embodiment of the present disclosure:

the CN CP is responsible for functions such as session management, mobility management, QoS control, and management of subscription information of the terminal;

the CN UP is responsible for functions such as service data forwarding;

the RAN controller is responsible for control of the RAN, specifically including resource allocation, mobility management, and the like;

the RAN network element, for example, may be a base station, and has functions such as service setup and a mobility function, and service data scheduling; and the terminal has functions such as data sending, receiving, and measurement.

In this embodiment of the present disclosure, the RAN network element includes but is not limited to the base station and/or the terminal.

As communication requirements are diversified, actual QoS requirements of different services are not the same. Especially with continuous development of video and Internet services, QoS requirements are more refined and dynamic.

In this embodiment of the present disclosure, a core network network element notifies the radio access network network element of different QoS requirements of different services. In other words, the radio access network network element may obtain QoS requirements of smaller granularities, and perform QoS processing on different service data, so that actual QoS requirements of different services can be satisfied better.

Specifically, the RAN network element obtains service data of a preset granularity, performs QoS classification based on a QoS requirement parameter of the service data of the preset granularity, and transmits the service data of the preset granularity based on a QoS class of the service data of the preset granularity.

Figure 2:
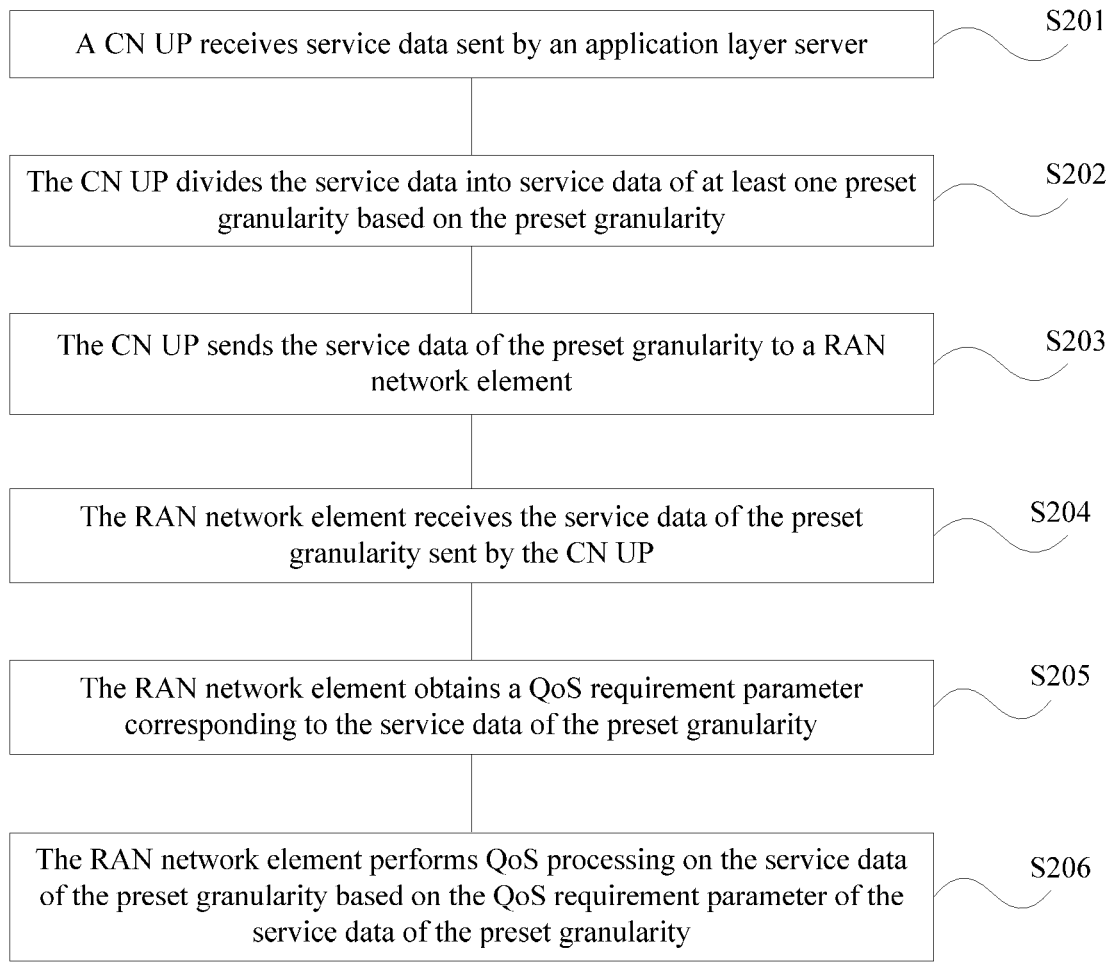
FIG. 2 is a schematic flowchart of Embodiment 1 of a data transmission method according to the present disclosure.

FIG. 2 is a schematic flowchart of Embodiment 1 of a data transmission method according to the present disclosure. As shown in FIG. 2, the method includes the following steps.

S201. A CN UP receives service data sent by an application layer server.

S202. The CN UP divides the service data into service data of at least one preset granularity based on the preset granularity.

The preset granularity for division by the CN UP may be a flow and/or an RB. The preset granularity may be preconfigured for the CN UP. However, this is not limited. The preset granularity may also be an evolved radio access bearer (E-RAB), a session, or the like.

That QoS requirements of the service data of the preset granularity are different may mean that a QoS requirement of data of a same E-RAB, a same bearer, a same flow, a same type, or a same session is different from a QoS requirement of other data.

For example, in WeChat services of a same type, a QoS requirement of a WeChat red packet service is different from a QoS requirement of another service. In a same application service, a QoS requirement of service data of a very important person (VIP) user is different from a QoS requirement of other service data. This is not limited herein. Division may be performed based on a specific implementation scenario.

S203. The CN UP sends the service data of the preset granularity to a RAN network element.

S204. The RAN network element receives the service data of the preset granularity sent by the CN UP.

Optionally, the CN UP may also send the service data to the RAN network element, and the RAN network element divides the service data into the service data of the preset granularity. This is not limited herein.

S205. The RAN network element obtains a QoS requirement parameter corresponding to the service data of the preset granularity.

Optionally, the RAN network element obtains, based on attribute information corresponding to the service data of the preset granularity and a preset QoS mapping relationship, the QoS requirement parameter corresponding to the service data of the preset granularity.

The attribute information may include one of the following or any combination thereof: preset feature information, a preset identifier, and a preset channel identifier.

A CN CP may notify the RAN network element of the preset QoS mapping relationship. Further, after receiving the service data of the preset granularity, the RAN may obtain, based on service data of different preset granularities and the preset QoS mapping relationship, different QoS requirement parameters corresponding to the service data of different preset granularities.

Optionally, the QoS requirement parameter includes at least one of the following or any combination thereof: a flow aggregate maximum bit rate (AMBR), a radio bearer AMBR (RB-AMBR), a terminal AMBR, a priority, a delay feature, a packet loss feature, a handover feature, a time-varying feature, and an allocation and retention priority (ARP).

Various sets of QoS requirement parameters reflect different QoS requirements, which may be specifically reflected as: different flow-AMBRs, different RB-AMBRs, different terminal AMBRs, different priorities, different delays, different packet loss rates, different allocation and retention priorities (ARP), different handover performance, and the like. This is not limited herein. In other words, for each set of QoS requirement parameters, content of included QoS requirement parameters may be different, and/or a specific parameter value is different.

The handover performance is a requirement of a service for handover performance, for example, one or more of a requirement for a handover delay, a requirement for a packet loss rate, and a requirement for session continuity. Herein the handover may be specifically a handover of a terminal between cells.

S206. The RAN network element performs QoS processing on the service data of the preset granularity based on the QoS requirement parameter of the service data of the preset granularity.

In a specific implementation process, that the RAN network element performs QoS processing on the service data of the preset granularity based on the QoS requirement parameter of the service data of the preset granularity may be: the RAN network element performs QoS requirement classification on the service data of the preset granularity, and determines, based on the QoS requirement parameter corresponding to the service data of the preset granularity, a QoS requirement parameter corresponding to a class of the service data of the preset granularity; and further, the RAN network element transmits the service data of the preset granularity based on the class of the service data of the preset granularity.

The CN UP may add a classification tag to service data of each preset granularity, or send service data of the preset granularity in different classes by using different channels, that is, send service data with a same QoS requirement by using a same channel, so that the RAN network element performs QoS requirement classification on the service data of the preset granularity.

After obtaining different QoS requirement parameters corresponding to different service data, the RAN network element may specifically perform different processing on different service data based on the QoS requirement parameters of different service data, to satisfy different QoS requirements of different services.

In this embodiment, the RAN network element obtains the service data of the preset granularity; further, the RAN network element obtains the QoS requirement parameter corresponding to the service data of the preset granularity, performs QoS requirement classification on the service data of the preset granularity, and determines the QoS requirement parameter corresponding to the class of the service data of the preset granularity; and further, the RAN network element transmits the service data of the preset granularity based on the class of the service data of the preset granularity. Therefore, the RAN network element can learn different QoS requirement parameters corresponding to service data of different preset granularities, and transmit the service data of the preset granularities separately based on classes of the service data of the preset granularities, to satisfy QoS requirements of the service data of different preset granularities.

Optionally, that the CN UP sends the service data of the preset granularity to a RAN network element may be that the CN UP sends the service data of the preset granularity separately based on different QoS requirement parameters corresponding to the service data of the preset granularity.

The CN CP may send a plurality of sets of QoS requirement parameters to the CN UP. Optionally, the CN UP may specifically determine, based on the plurality of sets of QoS requirement parameters, a mapping relationship between a QoS requirement parameter and a data feature, and the like, the QoS requirement parameter corresponding to the service data of the preset granularity. Specifically, the CN UP may determine a QoS requirement of each data packet with reference to other information of each data packet, for example, a source Internet Protocol (IP) address, a destination IP address, a source port address, and a destination port address.

In a manner, the CN UP adds different QoS identifiers to the service data of the preset granularity corresponding to different QoS requirement parameters, so that the RAN network element can determine, based on the QoS identifiers, the QoS requirement parameters corresponding to the service data of the preset granularity. In this case, the RAN-side network element needs to be first notified of a QoS requirement parameter represented by each QoS identifier.

Before S201, the CN CP may notify the CN UP and the RAN network element of a correspondence between a QoS identifier and a preset granularity (flow and/or RB).

The CN UP recognizes "a flow and/or an RB" to which each data packet belongs. If at least one data packet belongs to a same flow or a same RB, or belongs to both a same flow and a same RB, the CN UP adds a same QoS identifier to the at least one data packet.

Alternatively, in another manner, the CN UP sends the service data of the preset granularity corresponding to different QoS requirement parameters to the RAN network element separately by using a plurality of different channels, where each channel corresponds to a set of QoS requirement parameters. To be specific, the service data of the preset granularity corresponding to a same QoS requirement parameter may be sent on one channel. The RAN network element may determine, based on the channel for receiving the service data of the preset granularity, the QoS requirement parameter corresponding to the service data of the preset granularity. In this case, the RAN-side network element needs to be first notified of a QoS requirement parameter represented by each channel identifier.

Before S201, the CN CP may notify the CN UP and the RAN network element of a correspondence between a channel identifier and a preset granularity (flow and/or RB).

The CN UP recognizes a channel corresponding to each data packet. Specifically, if at least one data packet belongs to a same flow or a same RB, or belongs to both a same flow and a same RB, the CN UP sends the at least one data packet to the RAN network element by using a same channel.

Alternatively, optionally, the CN CP sends a mapping relationship between a QoS requirement parameter and a filter template parameter to the RAN network element beforehand, so that the RAN network element creates the corresponding filter template based on the mapping relationship between the QoS requirement parameter and the filter template parameter. The RAN network element filters each received data packet into a queue corresponding to different QoS requirement parameters. To be specific, the RAN network element puts each received data packet into a queue corresponding to a class of the data packet.

It should be noted that, herein the RAN network element includes a RAN data processing entity on a base station side, and also includes a terminal. Herein the terminal includes various types of terminals such as a common terminal, a low-capability terminal, and an ultra power saving terminal.

Before S201, the CN CP may notify the CN UP and the RAN network element of a correspondence between a used filter template parameter and a preset granularity (flow and/or RB).

Specifically, the CN CP may send a QoS requirement parameter to the CN UP before a service starts, and the QoS requirement parameter does not change in a subsequent service process. This manner is applicable to a service in which a data amount fluctuates slightly and a QoS requirement does not change, but this is not limited. Alternatively, the CN CP sends a QoS requirement parameter to the CN UP when a service starts, and sends an updated QoS requirement parameter to the CN UP periodically. This manner is applicable to a service in which a data amount fluctuates periodically and a QoS requirement changes regularly. Alternatively, the CN CP sends a QoS requirement parameter to the CN UP when a service starts, and subsequently sends an updated QoS requirement parameter to the CN UP based on an actual requirement, and triggers the CN UP to change the QoS requirement parameter. This manner is applicable to a service in which a data amount fluctuates, a QoS requirement changes irregularly, and the QoS requirement change cannot be expected.

The CN CP may also send the QoS requirement parameter to the RAN network element in a manner similar to the foregoing manners.

The CN CP may also send the QoS requirement parameter to the terminal in a manner similar to the foregoing manners.

Certainly, the CN CP may send the QoS requirement parameter to different network elements at different time, and this is not limited herein.

The QoS requirement parameter may include any one of the following or any combination thereof: a flow aggregate maximum bit rate (AMBR), a radio bearer AMBR (RB-AMBR), a terminal AMBR, a priority, a time delay, a packet loss rate, a handover feature, a time-varying feature, and an allocation and retention priority (ARP).

The flow AMBR may be understood as a total maximum bit rate of some flows. In other words, one or more flows are considered as an entirety, and a sum of bit rates of the flows cannot be greater than a maximum threshold. If the QoS requirement parameter includes the parameter, a "flow set" needs to be further indicated, where the "flow set" includes one or more flows.

The RB-AMBR is a total maximum bit rate of some RBs. In other words, one or more RBs are considered as an entirety, and a sum of bit rates of the RBs cannot be greater than a maximum threshold. If the QoS requirement parameter includes the parameter, an "RB set" needs to be further indicated, where the "RB set" includes one or more RBs.

Specifically, the CN CP may generate a plurality of sets of QoS requirement parameters based on a service feature parameter. Herein the service feature parameter may include any one of the following or any combination thereof: QoS information based on registration information, QoS information based on a local operator, QoS information based on a network slice, QoS information based on an application service, and the like.

Optionally, the application server may send the service feature parameter to the CN CP, or a home subscriber server (HSS) preconfigures the service feature parameter for the CN CP; or an operation administration and maintenance (OAM) preconfigures the service feature parameter for the CN CP. Certainly, this is not limited, and another network element may also send the service feature parameter to the CN CP, or preconfigure the service feature parameter for the CN CP.

Optionally, the CN CP may generate a plurality of sets of QoS requirement parameters based on the service feature parameter by using a radio resource management (RRM) algorithm, and this is not limited herein.

On a basis of the foregoing embodiment, the method further includes: the CN CP generates the preset QoS mapping relationship and sends the preset QoS mapping relationship to the radio access network network element. The CN CP may further directly send the preset QoS mapping relationship to the terminal.

In a specific implementation process, the CN CP may notify the RAN network element and/or the terminal of the preset QoS mapping relationship in a process such as initial context setup, evolved radio access bearer setup (E-RAB Setup), or evolved radio access bearer modification (E-RAB Modify).

Optionally, a core network network element may send the preset QoS mapping relationship to the RAN network element in a service setup or service modification process.

Optionally, the core network network element may also send the preset QoS mapping relationship to the RAN network element in any process related to the terminal/service.

Certainly, the RAN network element may also send the preset QoS mapping relationship to the terminal. To be specific, optionally, the RAN network element may further send the preset QoS mapping relationship to the terminal, and the terminal performs corresponding QoS processing after receiving the service data.

The preset QoS mapping relationship may be in a plurality of forms. For different preset QoS mapping relationships, methods for obtaining the QoS requirement parameter corresponding to the service data of the preset granularity by the RAN network element may also be different.

In an implementation, the preset QoS mapping relationship is a preset mapping relationship between feature information and a QoS requirement parameter. Generally, preset feature information is used to describe a feature of service data.

Optionally, the CN CP may obtain application layer information of different service data, or may further obtain application layer information of different service data by interacting with the application server, to further obtain different QoS requirement parameters of different service data, for example, obtain different QoS requirement parameters corresponding to different QoS requirements of different service data of a same bearer, a same flow, a same type, or a same session, and further generate a preset mapping relationship between feature information and a QoS requirement parameter.

After obtaining the application layer information of different service data, the CN CP may obtain QoS requirement parameters of different service data based on a preset rule, or may obtain QoS requirement parameters of different service data by negotiating with the application server.

For example, the core network network element reads application layer information of the WeChat service, and obtains, based on the preset rule, different QoS requirement parameters corresponding to different service data such as a WeChat voice, a WeChat text, or a WeChat red packet. The preset rule may include mapping relationships between different service data and QoS requirements.

Alternatively, the core network network element may negotiate with a WeChat server to preset QoS requirements of different service data, for example, different QoS requirements of different service data such as a WeChat voice, a WeChat text, or a WeChat red packet.

Figure 3:
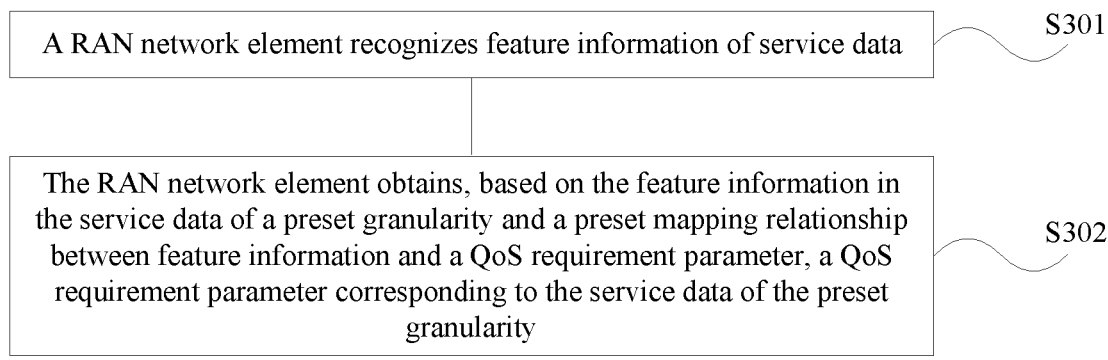
FIG. 3 is a schematic flowchart of Embodiment 2 of a data transmission method according to the present disclosure.

FIG. 3 is a schematic flowchart of Embodiment 2 of a data transmission method according to the present disclosure. As shown in FIG. 3, that the RAN network element obtains, based on attribute information corresponding to the service data of the preset granularity and a preset QoS mapping relationship, the QoS requirement parameter corresponding to the service data of the preset granularity may include:

S301. The RAN network element recognizes feature information of the service data of the preset granularity.

S302. The RAN network element obtains, based on the feature information of the service data of the preset granularity and the preset mapping relationship between the feature information and the QoS requirement parameter, the QoS requirement parameter corresponding to the service data of the preset granularity.

Specifically, after receiving the service data of the preset granularity, the RAN network element first recognizes the feature information and then may obtain, based on the preset mapping relationship between the feature information and the QoS requirement parameter, the QoS requirement parameter corresponding to the service data.

The mapping relationship may be specifically specified by using a protocol, and this is not limited herein.

Optionally, the feature information may include one of the following or any combination thereof: a protocol layer IP address, a port number, a feature field, an associated feature, and data flow behavior.

The protocol layer port number may be some special port numbers in the Transmission Control Protocol (TCP), and is not limited herein, or may be a port number in another protocol layer.

The feature field may be a packet feature field of the HyperText Transfer Protocol (HTTP), for example, keywords such as "GET", "POST", "HTTP/1.1", and "HOST". This is not limited herein.

The associated feature indicates a plurality of feature fields that are jointly recognized.

The data flow behavior is recognized behavior of a data flow, for example, including one of the following behavior or any combination thereof: a port range of packets, statistics of packet lengths (a packet length sequence, a packet length set, a packet length range, an average value of packet lengths, a sum of packet lengths in a round, and the like), packet sending frequency, a ratio of received packets to sent packets, and a destination address dispersity.

In another implementation, the preset QoS mapping relationship is a preset mapping relationship between a QoS identifier and a QoS requirement parameter.

Figure 4:
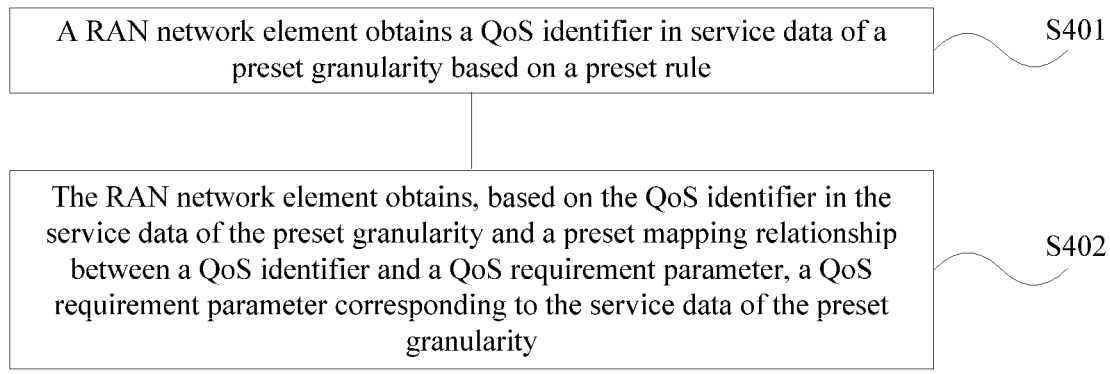
FIG. 4 is a schematic flowchart of Embodiment 3 of a data transmission method according to the present disclosure.

FIG. 4 is a schematic flowchart of Embodiment 3 of a data transmission method according to the present disclosure. As shown in FIG. 4, that the RAN network element obtains, based on attribute information corresponding to the service data of the preset granularity and a preset QoS mapping relationship, the QoS requirement parameter corresponding to the service data of the preset granularity may include:

S401. The RAN network element obtains a QoS identifier in the service data of the preset granularity based on a preset rule.

Optionally, the QoS identifier may be carried in a protocol layer header in a service data packet of the preset granularity, where the service data packet of the preset granularity carries the service data of the preset granularity. The preset rule may include a location indication of the QoS identifier, to be specific, indicates which bit is used as the QoS identifier.

That the RAN network element obtains a QoS identifier in the service data of the preset granularity based on a preset rule may be: the RAN network element obtains the QoS identifier from a header of a data packet of the service data of the preset granularity based on the preset rule. Certainly, this is not limited.

For example, six reserved bits of a TCP header, extended space of a GTPU header, a DSCP field in IP, or the like is used as the QoS identifier. Optionally, different values of the DSCP field correspond to different QoS requirement parameters. For example, 00000001 identifies a set of QoS requirement parameters, and 00000011 identifies another set of QoS requirement parameters. This is not limited herein, and may be set flexibly based on a specific QoS processing granularity or a QoS requirement.

S402. The RAN network element obtains, based on the QoS identifier in the service data of the preset granularity and the preset mapping relationship between the QoS identifier and the QoS requirement parameter, the QoS requirement parameter corresponding to the service data of the preset granularity.

Specifically, the CN CP may preset a plurality of sets of sub QoS requirement parameters, where each set of QoS requirement parameters may include one of the following or any combination thereof: a flow AMBR, an RB-AMBR, a terminal AMBR, a priority, a delay feature, a packet loss feature, a handover feature, a time-varying feature, an ARP, and the like. This is not limited herein.

After receiving the service data packet of the preset granularity that carries the service data of the preset granularity, the RAN network element obtains the QoS identifier, and may further obtain, based on the preset mapping relationship between the QoS identifier and the QoS requirement parameter, the QoS requirement parameter corresponding to the service data of the preset granularity, and therefore may further know the QoS requirement of the service data of the preset granularity.

Optionally, the QoS mapping relationship is a preset mapping relationship between a channel identifier and a QoS requirement parameter. The CN UP sends service data of preset granularities of different QoS requirements by using different channels. To be specific, service data of preset granularities corresponding to a same set of QoS requirement parameters may be sent by using a same channel.

Similarly, that the RAN network element obtains, based on attribute information corresponding to the service data of the preset granularity and a preset QoS mapping relationship, the QoS requirement parameter corresponding to the service data of the preset granularity may include: the RAN network element determines a channel for receiving the service data of the preset granularity, and obtains, based on the channel for receiving the service data of the preset granularity and the preset mapping relationship between the channel identifier and the QoS requirement parameter, the QoS requirement parameter corresponding to the service data of the preset granularity.

Further, in another implementation, before obtaining the QoS requirement parameter corresponding to the service data of the preset granularity, the RAN network element further receives enhanced QoS attribute information sent by the core network network element.

Correspondingly, that the RAN network element obtains the QoS requirement parameter corresponding to the service data of the preset granularity may be: the RAN network element obtains, based on the enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute.

The following should be noted: (1) The time-varying attribute is used to identify whether a status of the service data changes with time in a service process, and whether the QoS requirement parameter changes with the status of the service data.

The change of the QoS requirement parameter may be a change of content of the QoS requirement parameter, and/or a change of a specific parameter value.

For example, a video service may have different QoS requirements in different time dimensions. For example, the QoS requirements may be different in prelude, plot content, advertisement, and caption parts, and the QoS requirements of packets in different time positions may also be different when the video is dragged. The RAN may consider different processing manners. For example, if a data packet of the video service belongs to the advertisement part, QoS processing different from that of the pilot content may be used. However, a voice call may require that QoS should keep stable in a whole call process, that is, a QoS requirement should not change with a status of service data.

(2) The classification attribute is used to identify whether the service data is classified based on the QoS requirement parameter.

Different parts of the same service data may also have different QoS requirements, and the service data needs to be classified based on the QoS requirement parameter. Even in a same service, a same time period may correspond to different QoS requirement parameters.

When the service data needs to be classified based on the QoS requirement parameter, a preset field in the service data of the preset granularity may be extended as a class identifier, to specifically identify classification information of different parts in the service data. Specifically, an application layer may indicate the class identifier in the service data to the RAN network element.

For example, for a video service, considering different frames of a video, such as an initial phase of the video: a dynamic part is first transmitted, a priority of a background part is slightly lower, and a plurality of subsequent background frames jointly implement high definition.

(3) The granularity attribute is used to identify a QoS processing granularity.

QoS requirements of different services may be different. Correspondingly, the QoS processing granularity may also vary. For example, processing may be performed based on a "per bearer" granularity, or processing may be performed based on a "flow (flow)" granularity, or processing may be performed based on a "packet (packet)" granularity. However, this is not limited.

When the enhanced QoS attribute information received by the RAN network element includes the granularity attribute, before the RAN network element obtains, based on the class of the service data of the preset granularity, another parameter identifying a service data attribute, and the preset QoS mapping relationship, the QoS requirement parameter corresponding to the service data of the preset granularity, the RAN network element may select filter templates of different granularities based on the processing granularity specifically indicated by the granularity attribute. For example, if the "flow" granularity is used to process the service data of the preset granularity, the service data of the preset granularity is filtered by using a filter template of the "flow" granularity, so that different flows are obtained.

In this manner, the CN UP may send service data of a relatively coarse granularity to the RAN network element, and the RAN network element performs further division to obtain smaller granularities.

Optionally, in a service setup or modification process, the CN CP sends a plurality of sets of filter templates of different granularities to the RAN network element and the terminal.

The RAN network element may determine, based on specific content of the enhanced QoS attribute information, whether to obtain, based on the service data of the preset granularity and the preset QoS mapping relationship, the QoS requirement parameter corresponding to the service data of the preset granularity.

In other words, QoS requirement parameters of all services do not need to be determined based on small granularities according to the foregoing method. Whether this action is required may be determined based on a specific attribute. To be specific, when a condition is satisfied, the QoS requirement parameter corresponding to the service data is obtained according to the foregoing method.

Optionally, when the enhanced QoS attribute information includes the time-varying attribute, and the time-varying attribute identifies that the service data is time-varying, that is, the status of the service data changes with time in the service process, and the QoS requirement changes with the service data, the QoS requirement parameter corresponding to the service data of the preset granularity is obtained based on the service data of the preset granularity and the preset QoS mapping relationship. Conversely, if the enhanced QoS attribute does not include the time-varying attribute, or the enhanced QoS attribute includes the time-varying attribute but the time-varying attribute identifies that the service data is not time-varying, the QoS requirement parameter corresponding to the service data of the preset granularity does not need to be obtained. For example, coarse-granularity QoS processing may be performed according to the prior art. This is not limited herein.

Optionally, if the enhanced QoS attribute information includes the classification attribute and the classification attribute identifies that QoS requirement classification needs to be performed on the service data, the QoS requirement parameter corresponding to the service data of the preset granularity is obtained based on the service data of the preset granularity and the preset QoS mapping relationship. Conversely, if the enhanced QoS attribute does not include the classification attribute, or the enhanced QoS attribute includes the classification attribute but the classification attribute identifies that QoS requirement classification does not need to be performed on the service data, the QoS requirement parameter corresponding to the service data of the preset granularity does not need to be obtained. For example, coarse-granularity QoS processing may be performed according to the prior art. This is not limited herein.

Optionally, when the enhanced QoS attribute information includes the granularity attribute and the granularity attribute identifies that the processing granularity is "per bearer" or "flow", the QoS requirement parameter corresponding to the service data of the preset granularity is obtained based on the service data of the preset granularity and the preset QoS mapping relationship. If the enhanced QoS attribute information includes the granularity attribute and the granularity attribute identifies that the processing granularity is "packet", which indicates that the processing granularity itself is relatively small, the QoS requirement parameter corresponding to the service data of the preset granularity does not need to be obtained based on the service data of the preset granularity and the preset QoS mapping relationship. If the enhanced QoS attribute does not include the granularity attribute, the QoS requirement parameter corresponding to the service data of the preset granularity may not be obtained either, and further coarse-granularity QoS processing may be performed according to the prior art. This is not limited herein.

Optionally, the CN CP may also configure different QoS requirement parameters based on the enhanced QoS attribute information. To be specific, the QoS requirement of the service data of the preset granularity is satisfied based on the enhanced QoS attribute of the service data of the preset granularity.

The service status is time-varying, and different service statuses require different QoS processing for ensuring service requirements.

Further, when the enhanced QoS attribute information includes the time-varying attribute, the preset QoS mapping relationship includes a mapping relationship between the status of the service data and the QoS requirement parameter. Specifically, the CN CP may negotiate with the application layer server to determine a plurality of sets of QoS requirement parameters, for example, generate a plurality of sets of QoS requirement parameters based on information such as a service requirement change, user subscription information, and a core network policy. Each set of QoS requirement parameters corresponds to different service statuses.

For the time-varying attribute, the CN CP may obtain a feature reflecting the time-varying attribute, and further configure the mapping relationship between the status of the service data and the QoS requirement parameter.

Optionally, that the RAN network element obtains a QoS requirement parameter corresponding to the service data of the preset granularity may be: the RAN network element obtains a current service status of the service data of the preset granularity; and the RAN network element obtains, based on the current service status of the service data of the preset granularity and the mapping relationship between the status of the service data and the QoS requirement parameter, a QoS requirement parameter corresponding to the current service status of the service data of the preset granularity.

Specifically, the RAN network element may monitor in real time the service status of the service data of the preset granularity, and when a status of a service of a preset granularity changes, determine, based on the mapping relationship between the status of the service data and the QoS requirement parameter, the QoS requirement parameter corresponding to the current service status of the service data of the preset granularity. For example, the RAN network element may recognize, based on feature information of the service data, that the service status changes. However, this is not limited.

Optionally, the application layer server may also indicate, to a lower layer (a protocol layer below an application layer in the CN CP, the RAN network element, or the terminal, for example, a network side), that the service status changes, and that the QoS requirement parameter needs to be changed.

To be specific, before the RAN network element obtains, based on the service data of the preset granularity and the preset QoS mapping relationship, the QoS requirement parameter corresponding to the service data of the preset granularity, the RAN network element may further receive a service status change notification message sent by the application layer server. The service status change notification message may carry the current service status. In this case, after receiving the service status change notification message, the RAN network element determines the current service status of the service data of the preset granularity based on the service status change notification message, and obtains, based on the mapping relationship between the status of the service data and the QoS requirement parameter, the QoS requirement parameter corresponding to the current service status of the service data of the preset granularity; or the service status change notification message may directly carry a QoS requirement parameter indicated by the application layer, and the RAN network element may directly determine, based on the service status change notification message, a changed QoS requirement parameter of the service data of the preset granularity.

For example, the feature reflecting the time-varying attribute may include a repeated data packet, a location of the data packet in a slice, time period information of a video service, and the like. Specifically, the repeated data packet may be detected by using a protocol sequence number. If the repeated data packet is determined, QoS information such as transmission reliability and/or a priority of the repeated data packet is provided. For example, for a retransmitted Transmission Control Protocol (TCP) packet, a higher priority may be reflected during processing at an RLC layer, so that cross-layer optimization is implemented.

For video services of a plurality of terminals, a feature for identifying a location of a data packet in a slice is provided. For example, after receiving a service data packet, if detecting a data packet located ahead in the slice, the RAN network element may determine the corresponding QoS requirement parameter based on the mapping relationship between the status of the service data and the QoS requirement parameter. Generally, processing such as increasing a sending priority of the data packet located ahead in the slice may be performed to improve smoothness of video playing and improve user experience.

If the enhanced QoS attribute information received by the RAN network element includes the classification attribute, a preset mechanism needs to be used to obtain different QoS requirement parameters corresponding to different classified parts of the service data of the preset granularity, so as to further perform QoS processing.

Optionally, the preset QoS mapping relationship may include a mapping relationship between a class identifier and a QoS requirement parameter.

That the RAN network element obtains a QoS requirement parameter corresponding to the service data of the preset granularity may be: the RAN network element obtains a class identifier of the service data of the preset granularity; and the RAN network element obtains, based on the class identifier of the service data of the preset granularity and the mapping relationship between the class identifier and the QoS requirement parameter, a QoS requirement parameter corresponding to each classified part of the service data of the preset granularity.

Further, if the enhanced QoS attribute information includes the granularity attribute, in the service setup or modification process, the CN CP may further send a plurality of sets of QoS requirement parameters to the RAN network element and the terminal, where the plurality of sets of filter templates of different granularities correspond to the plurality of sets of QoS requirement parameters on a one-to-one basis.

Correspondingly, the preset QoS mapping relationship may include a mapping relationship between a filter template and a QoS requirement parameter, and that the RAN network element obtains a QoS requirement parameter corresponding to the service data of the preset granularity may be:

the RAN network element divides, based on a selected filter template, the service data of the preset granularity into service data of a granularity corresponding to at least one filter template, and obtains, based on a mapping relationship between a filter template and a QoS requirement parameter, a QoS requirement parameter corresponding to the service data of the granularity corresponding to the at least one filter template.

It should be noted that, the enhanced QoS attribute information may change dynamically. For example, at the beginning, enhanced QoS attribute information sent by the CN CP to the RAN network element includes a time-varying attribute, where the time-varying attribute indicates that the status of the service data changes with time in the service process and that the QoS requirement changes with the status of the service data. After a period of time, the CN CP may send enhanced QoS attribute information to the RAN network element again, where the enhanced QoS attribute information still includes a time-varying attribute, but the current time-varying attribute indicates that the status of the service data does not change with time in the service process and that the QoS requirement does not change with the status of the service data, that is, the time-varying attribute changes from time-varying to non time-varying. Alternatively, after a period of time, the CN CP sends enhanced QoS attribute information to the RAN network element again, where the enhanced QoS attribute information does not include a time-varying attribute.

Similarly, the classification attribute and the granularity attribute may both change dynamically. Subsequent QoS requirement obtaining and QoS processing may both change dynamically.

Certainly, the foregoing example is not limited.

Figure 5:
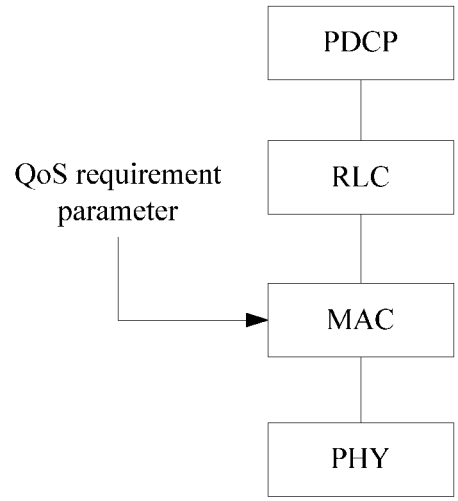
FIG. 5 is a schematic diagram of a processing scenario of a data transmission method according to the present disclosure.

FIG. 5 is a schematic diagram of a processing scenario of a data transmission method according to the present disclosure. As shown in FIG. 5, the RAN network element may process functions of a plurality of different protocol layers in a unified manner. Specifically, from top to bottom, the plurality of protocol layers may include: a Packet Data Convergence Protocol (PDCP) layer, a Radio Link Control (RLC) protocol layer, a MAC layer, and a physical (PHY) layer.

On a basis of the foregoing embodiment, the RAN network element needs to perform different processing based on different QoS requirements of service data of different preset granularities.

The RAN network element may perform different processing by using a plurality of methods. The following uses several methods as examples for description. The following several solutions may be used in combination based on a specific requirement, or may be used separately. This is not limited herein.

1. That the RAN network element transmits the service data of the preset granularity based on the class of the service data of the preset granularity may be:

the RAN network element uses the QoS requirement parameter corresponding to the class of the service data of the preset granularity as an input for MAC layer scheduling, and performs QoS processing on the service data of the preset granularity through MAC layer scheduling.

Specifically, for different service data, different priorities may be considered for processing at the MAC layer, that is, scheduling is performed with different priorities, or different transmission rates are considered for scheduling, or the like, to satisfy different QoS requirements of the service data.

Certainly, this is not limited. The foregoing flow AMBR, RB-AMBR, terminal AMBR, delay feature, packet loss feature, handover feature, time-varying feature, and ARP, and the like may be further considered for different scheduling.

Optionally, if MAC layer scheduling still cannot completely satisfy QoS requirements of some service data, QoS processing may be performed in combination with the following two manners.

For example, if a QoS requirement parameter corresponding to service data of a preset granularity relates only to a priority and a transmission rate, MAC layer scheduling can completely satisfy a QoS requirement, and the QoS requirement parameter corresponding to the service data of the preset granularity may be used as an input for MAC layer scheduling to perform QoS processing.

If a QoS requirement corresponding to service data of a preset granularity further relates to the handover feature, the time-varying feature, or the like, and MAC layer scheduling cannot satisfy a QoS requirement well in some scenarios, the following two solutions may be used to satisfy other QoS requirements, and MAC layer scheduling is used to implement only partial QoS processing. Certainly, in this case, the following two solutions may also be directly selected for QoS processing.

For subsequent QoS processing of the terminal, refer to this combination manner for QoS processing. This is not limited herein.

2. Before the RAN network element performs QoS processing on the service data of the preset granularity based on the QoS requirement parameter corresponding to the service data of the preset granularity, the RAN network element generates a plurality of sub radio bearers (RB), where each sub RB corresponds to different QoS requirement parameters.

Optionally, in an implementation method, the RAN network element may generate a plurality of sub RBs dynamically. Specifically, the RAN may generate a plurality of sub RBs based on a preset QoS mapping relationship sent by the CN CP. For example, the RAN may generate, based on a preset mapping relationship between feature information and QoS requirements, a plurality of sub RBs corresponding to different feature information, or generate, based on a preset mapping relationship between QoS identifiers and QoS requirement parameters, a plurality of sub RBs corresponding to different QoS identifiers. This is not limited herein.

Optionally, in another implementation method, the CN CP sends a plurality of sets of QoS requirement parameters to the RAN network element, and the RAN network element directly generates a plurality of sub RBs based on the plurality of sets of QoS requirement parameters, so that each sub RB corresponds to a set of QoS requirement parameters.

After generating the plurality of sub RBs, the RAN network element transmits the service data of the preset granularity based on the class of the service data of the preset granularity. The process may be: the RAN network element selects, based on the QoS requirement parameter corresponding to the class of the service data of the preset granularity and a mapping relationship between a sub RB and a QoS requirement parameter, a corresponding sub RB for transmitting the service data of the preset granularity.

It should be noted that, in the mapping relationship between the sub RB and the QoS requirement parameter, different identifiers may be used to indicate different QoS requirement parameters. For example, QCIs are selected for identifying different QoS requirement parameters. This is not limited herein.

Optionally, on a basis of the foregoing embodiment, different sub RBs may be further configured in different cell groups. For example, some sub RBs may be configured in a master cell group (MCG), and other sub RBs are configured in a secondary cell group (SCG). However, this is not limited.

In a specific implementation process, a sub RB corresponding to a QoS requirement parameter with a relatively high QoS requirement may be configured in a cell group that has low cell load and good channel quality.

For example, if a QoS requirement of a first QoS requirement parameter is higher than that of a second QoS requirement parameter, and cell load of the MCG is lower than that of the SCG and/or channel quality of the MCG is higher than that of the SCG a sub RB corresponding to the first QoS requirement parameter is configured in the MCG Further, the sub RB may be handed over between different cells based on a corresponding QoS requirement parameter.

Optionally, if a data throughput of a sub RB is greater than a preset value, the RAN network element may offload service data transmitted on the RB, that is, offload the service data transmitted on the sub RB to a plurality of cells for transmission, to increase a transmission rate and a bandwidth.

Figure 6:
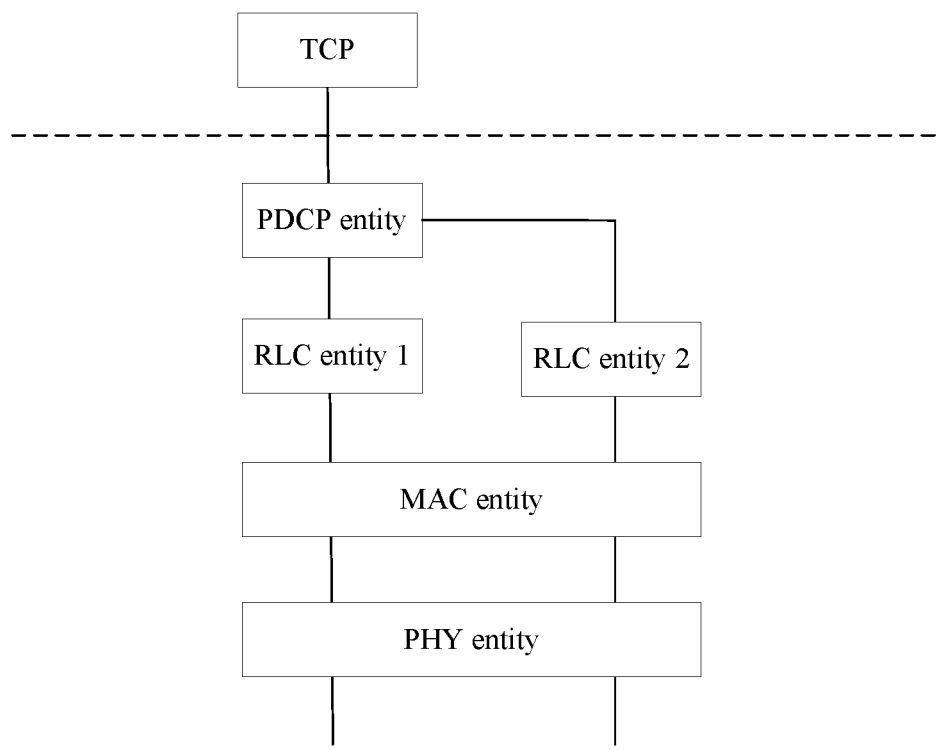
FIG. 6 is a schematic diagram of another processing scenario of a data transmission method according to the present disclosure.

FIG. 6 is a schematic diagram of another processing scenario of a data transmission method according to the present disclosure. As shown in FIG. 6, in a same cell, the RAN network element may generate a plurality of sub RBs at an RLC layer below a PDCP layer, that is, generate a plurality of sub RBs at the RLC layer, where each sub RB corresponds to different QoS attributes.

As shown in FIG. 6, each sub RB corresponds to an RLC entity. In FIG. 6, two sub RBs are used as an example, and are denoted by an RLC entity 1 and an RLC entity 2 respectively. Optionally, each sub RB may also correspond to two RLC entities, and the two RLC entities correspond to an uplink service and a downlink service on a same sub RB respectively; or two RLC entities correspond to different flows on a same RB respectively, and each flow corresponds to a more refined QoS attribute.

Assuming that the processing granularity of the RAN network element is "flow", after receiving data sent by the core network user plane entity, the RAN network element splits the data into a plurality of flows. Assuming that one flow is used for initially transmitting service data and that another flow is used for retransmitting the service data, QoS requirements of the two flows are different. Specifically, because a window mechanism is used in TCP, TCP expects a bottom layer to deliver data packets to a receiving TCP entity in order. Otherwise, fast retransmission may be triggered, a congestion window is also reduced by half, and therefore a link throughput is reduced. However, it is required that a retransmitted TCP packet should be delivered as soon as possible. To be specific, a service data packet is delivered to the receiving TCP entity upon reception, and delivery in order is not required.

In an implementation process, after delivering the plurality of flows to a same PDCP entity for processing, the RAN network element delivers the flows to different RLC entities for processing. To be specific, one RLC entity processes the initially transmitted service data, and another RLC entity processes the retransmitted service data. Optionally, to better obtain diversity gains, the two RLC entities may also both process the retransmitted service data. To be specific, one of the RLC entities processes not only the initially transmitted service data but also the retransmitted service data. This is not limited herein.

In a manner, the PDCP entity allocates a PDCP sequence number (SN) only to packets of the initially transmitted service data, but does not allocate a PDCP sequence to packets of the retransmitted service data. After receiving the packets of the initially transmitted service data, the RLC entity processing the initially transmitted service data transfers the packets in order based on the PDCP sequence. In a scheduling process, the retransmitted service data is processed preferentially. In other words, a scheduler first schedules the retransmitted service data, and if there is still remaining transmission space, arranges transmission of the initially transmitted service data. It should be noted that, in a data transfer process, when a handover occurs, that is, when the terminal is handed over to another cell, if the RLC entity processing the retransmitted service data still has buffered data, the RLC entity returns the buffered data to the PDCP entity, and the PDCP entity sends the buffered data again in a new cell.

In another manner, PDCP sequences are allocated to the initially transmitted service data and the retransmitted service data in a unified manner, but a receiving RLC entity still transfers the packets of the retransmitted service data directly, and does not transfer the packets in order. However, because the PDCP sequences are allocated in a unified manner, and some sequence numbers are allocated to the packets of the retransmitted service data, a receiving PDCP entity needs to remember which data packets come from the RLC entity processing the retransmitted service data and which data packets come from the RLC entity processing the initially transmitted service data. Assuming that among seven sequence numbers 1 to 7, 1, 2, 4, 5, and 7 are allocated to five packets of the initially transmitted service data, and 3 and 6 are allocated to two packets of the retransmitted service data, an RLC entity 1 processes the initially transmitted service data, and an RLC entity 2 processes the retransmitted service data. After the PDCP entity transfers the five packets 1, 2, 3, 4, and 5 to an upper layer, when the PDCP entity receives the packet 7, the PDCP entity needs to determine whether to transfer the packet 7 to the upper layer, and needs to wait for the packet 6 if the packet 6 is a packet of the initially transmitted service data, or immediately transfers the packet 7 to the upper layer if the packet 6 is a packet of the retransmitted service data. It should be noted that, if a handover occurs after the packet 7 is received, that is, if the terminal is handed over to a new cell, the RLC entity performs resetting. To be specific, a buffer in the RLC entity is cleared. Therefore, the RLC entity cannot accurately notify the PDCP entity whether the packet 6 is a packet of the initially transmitted service data or a packet of the retransmitted service data. In this case, the PDCP entity buffers the packet 7, and does not transfer the packet 7 until the packet 6 is received.

Figure 7:
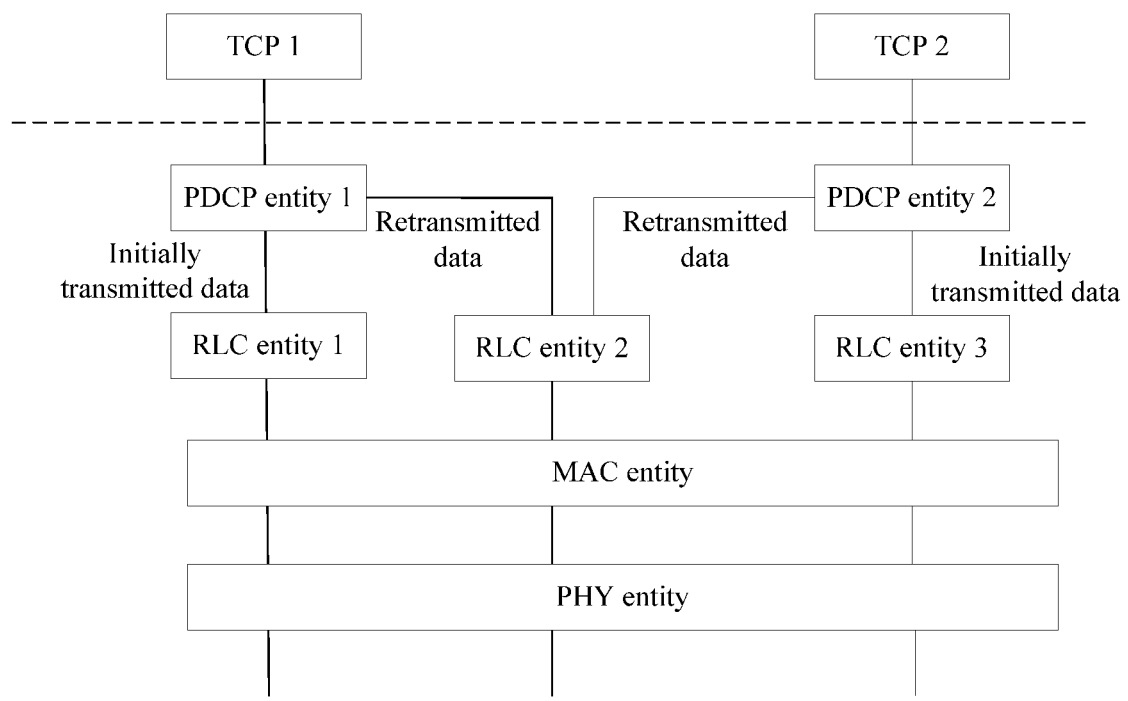
FIG. 7 is a schematic diagram of another processing scenario of a data transmission method according to the present disclosure.

FIG. 7 is a schematic diagram of another processing scenario of a data transmission method according to the present disclosure. As shown in FIG. 7, on a basis of FIG. 6, some service data of the preset granularity may share an RLC entity. In this case, after receiving a data packet transferred by a PDCP entity, a sending RLC entity needs to add a PDCP tag to a header of the data packet, where the PDCP tag is used to identify the PDCP entity from which the data packet comes, so that a receiving RLC entity can send the data packet to a corresponding receiving PDCP entity based on the PDCP tag of the data packet when receiving the service data packet.

Assuming that the processing granularity of the RAN network element is "flow", after receiving data sent by the core network user plane entity, the RAN network element splits the data into a plurality of flows. Assuming that one flow is used for initially transmitting service data and that another flow is used for retransmitting the service data, each flow for initially transmitting the service data uses an independent PDCP entity and an independent RLC entity, and two or more flows for retransmitting the service data share one RLC entity. In this example, it is assumed that two flows for retransmitting the service data share an RLC entity 3. After receiving a retransmitted service data packet sent by each PDCP entity, the RLC entity 3 adds a PDCP tag to a header of the retransmitted service data packet, where the PDCP tag is used to identify the PDCP entity from which the data packet comes.

Figure 8:
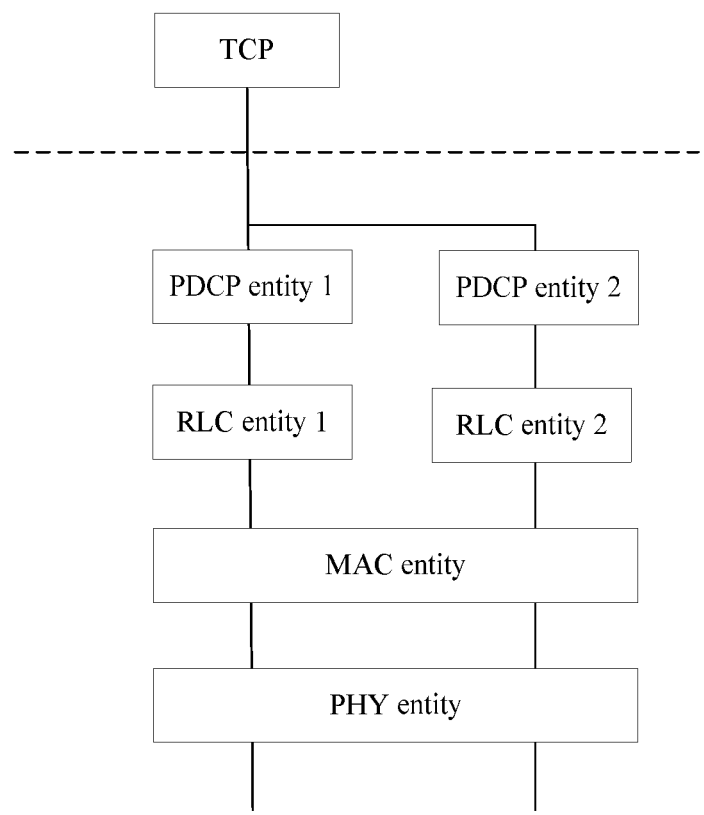
FIG. 8 is a schematic diagram of another processing scenario of a data transmission method according to the present disclosure.

FIG. 8 is a schematic diagram of another processing scenario of a data transmission method according to the present disclosure. As shown in FIG. 8, in a same cell, the RAN network element generates a plurality of sub RBs, or may directly perform the processing at the PDCP layer.

Using initially transmitted service data and retransmitted service data as an example, QoS requirements of the two types of service data are different. Specifically, because a window mechanism is used in TCP, TCP expects a bottom layer to deliver data packets to an upper layer in order. Otherwise, fast retransmission may be triggered, a congestion window is also reduced by half, and therefore a link throughput is reduced. However, it is required that a retransmitted TCP packet should be delivered as soon as possible. To be specific, a service data packet is delivered to the upper layer upon reception. Obviously, a priority of the retransmitted service data is higher than a priority of the initially transmitted service data.

Referring to FIG. 8, initially transmitted service data and retransmitted service data use independent PDCP entities and RLC entities respectively.

For a retransmitted service data packet, one of the following manners or any combination thereof may be used to ensure reduction of a transmission delay:

(1) If a retransmitted service data packet is received, the MAC entity selects the retransmitted service data packet preferentially when organizing a transport block (TB) for transmission.

TB transmission means that the MAC layer obtains data from the RLC layer, and organizes the obtained data into the TB for transmission at the physical layer.

(2) The MAC entity preferentially uses a subframe of a short TTI to transmit the retransmitted service data packet.

(3) The retransmitted service data packet is not segmented, but is only subject to concatenation on the RLC entity. This prevents a segment of the retransmitted service data packet from waiting for reassembly on the RLC entity. It should be noted that, because no segmentation is performed, the receiving RLC entity does not need to use a plurality of RLC protocol data units (PDU) to assemble an RLC service data unit (SDU). Therefore, an RLC sequence does not need to be allocated in this manner.

Alternatively, the retransmitted service data packet is subject to both concatenation and segmentation on the sending RLC entity, but the receiving RLC entity attempts to assemble, every time an RLC PDU is received, the RLC PDU into an RLC SDU, and if the RLC SDU is assembled, sends the RLC SDU to the PDCP entity. If the RLC entity finds that a segment of the RLC PDU cannot be assembled into an RLC SDU, the RLC entity first delivers the RLC SDU that can be assembled to the PDCP entity, but the RLC PDU continues to wait in an RLC queue, and after a next RLC PDU arrives, the RLC entity attempts to assemble half an RLC SDU. This can reduce a waiting time of the data segment in a receive-end buffer. This process enables the receiving RLC entity to recognize order of RLC PDUs, so that a plurality of RLC PDUs are used to assemble an RLC SDU. This can reduce the waiting time of the data segment in the buffer. In this manner, an RLC sequence number needs to be allocated to each RLC PDU.

(4) If a plurality of TCP acknowledgement (ACK) characters of data packets that belong to a same retransmitted service data flow are recognized in the buffer, the RLC entity transmits only a last ACK.

If the RLC entity has two retransmitted service data packets, a retransmitted service data packet that is farther away from an initial transmission time is first transmitted; or data in the two retransmitted service data packets is compared with current data, and a retransmitted service data packet separated by more bytes is first transmitted; or the two retransmitted service data packets are compared with a current data packet, and a retransmitted service data packet separated by a larger quantity of packets is first transmitted. It should be noted that, in TCP, data packets are numbered for transmission, and a number of an initially transmitted data packet increases monotonously, but a number of a retransmitted data packet remains unchanged. Therefore, a packet number of a retransmitted data packet is certainly arranged before a packet number of a data packet that is currently being transmitted.

It should be noted that, FIG. 6 to FIG. 8 are merely examples. In an implementation, each sub RB may correspond to one PDCP entity, one RLC entity (or two), and the MAC layer performs priority scheduling and multiplexing/demultiplexing processing on data in a logical channel corresponding to the sub RB.

After generating a plurality of RBs, the RAN network element may configure different protocol layer parameters, logical channel parameters, and the like for each sub RB. Specifically, a PDCP layer parameter may include at least one of the following or any combination thereof: a discard timer, header compression, a reordering timer, a sequence number (SN) length, and the like. An RLC parameter may include at least one of the following or any combination thereof: an uplink/downlink RLC mode, a poll retransmission timer, a status prohibit timer (t-Status Prohibit), a poll query (PDU), a poll byte, a maximum quantity of retransmission times, a reordering timer, an SN length, and the like. A logical channel parameter may include at least one of the following or any combination thereof: a priority, a prioritized rate (prioritized BitRate), a bucket size (bucket Size Duration), a home logical channel group, and the like.

On a basis of the foregoing embodiment, to save resources, the RAN network element may release a sub RB. Optionally, after releasing all service data on a first sub RB, the RAN network element releases the first sub RB, where the first sub RB may be any sub RB; or after receiving a service data release notification sent by the CN CP, the RAN network element releases service data, and releases a sub RB, and specifically, the CN CP may specifically instruct the RAN to release service data on a first sub RB and release the first sub RB, where the first sub RB may be any sub RB; or when detecting that a sub RB corresponding to a first QoS requirement parameter does not receive any service data in a preset time period, the RAN network element releases the sub RB corresponding to the first QoS requirement parameter, where the first QoS requirement parameter may be any set of QoS requirement parameters. Certainly, the several solutions are not limited.

3. That the RAN network element transmits the service data of the preset granularity based on the class of the service data of the preset granularity may include: the RAN network element selects, based on the QoS requirement parameter corresponding to the class of the service data of the preset granularity, a processing template used by each protocol layer, where the processing template includes a corresponding QoS requirement parameter. Further, the RAN network element transmits the service data of the preset granularity based on the processing template used by each protocol layer.

Specifically, in this implementation, corresponding processing templates may be preset for different protocol layers of a same RB. Certainly, a mapping relationship between a protocol layer and a processing template may change dynamically, and is not always fixed. Each processing template corresponds to different QoS requirement parameters.

Each protocol layer may select a processing template by itself, or a preset module in the RAN network element selects a processing template in a unified manner:

(1) The RAN network element translates and corrects, at each protocol layer, the QoS requirement parameter corresponding to the service data of the preset granularity, and notifies a next protocol layer; and each protocol layer makes a selection by itself based on the obtained QoS requirement parameter.

For example, the PDCP layer may select a PDCP layer processing template corresponding to the QoS requirement parameter corresponding to the service data of the preset granularity, and provide related information of the QoS requirement parameter for the next RLC layer, so that the RLC layer selects a processing template suitable for the RLC layer.

(2) The RAN network element selects a corresponding processing template for each protocol layer based on the QoS requirement parameter corresponding to the service data of the preset granularity, that is, selects a processing template for each protocol layer in a unified manner.

A unique identifier (id) is configured for a processing template of each protocol layer, and a receive-end protocol layer entity receives, restores, and delivers a service data packet to the upper layer based on the ID. For example, the RLC entity receives the service data packet delivered from the lower layer, and selects a specific RLC layer processing template based on the ID of the processing template to perform processing.

On a basis of the processing by the PDCP layer and the RLC layer, the MAC layer performs optimization and scheduling of service data, for example, performs scheduling with different priorities. This is not limited herein.

In the foregoing embodiment, an L2 protocol stack of LTE is used merely as an example. The embodiment is applicable to other protocol stack forms, where, for example, there is no RLC layer, or some functions of the RLC layer are migrated to the MAC or PDCP layer. Similar to the RAN network element, the terminal may also perform smaller-granularity QoS processing on the service data based on different QoS requirements of the service data.

Figure 9:
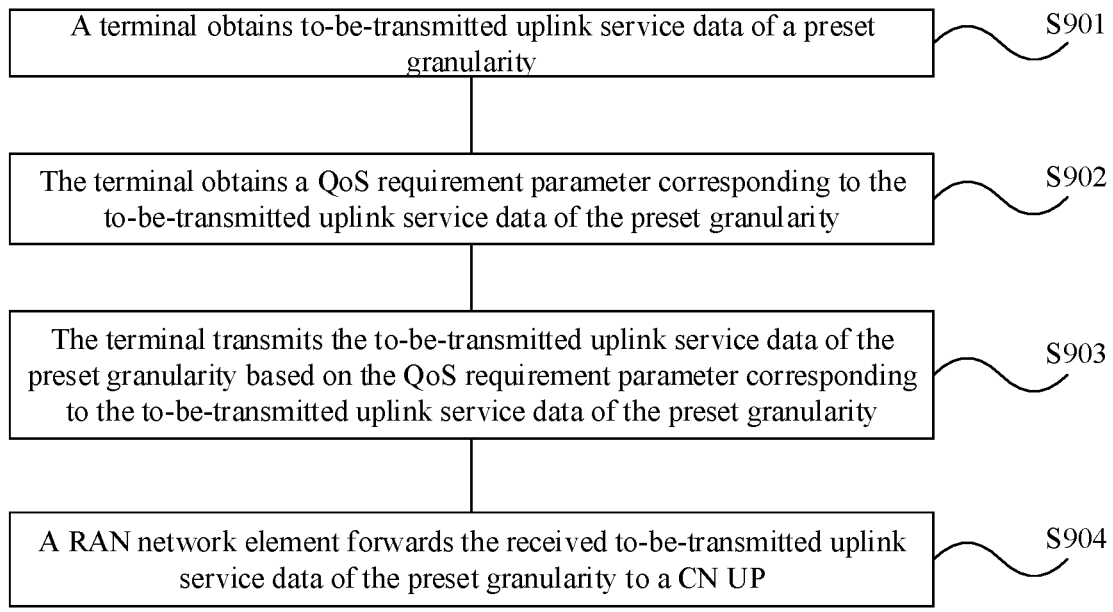
FIG. 9 is a schematic flowchart of Embodiment 4 of a data transmission method according to the present disclosure.

FIG. 9 is a schematic flowchart of Embodiment 4 of a data transmission method according to the present disclosure. As shown in FIG. 8, the method includes the following steps.

S901. A terminal obtains to-be-transmitted uplink service data of a preset granularity.

Optionally, after receiving the uplink service data, the terminal may map, based on a slice in which the uplink service data is located, which data flows may be transmitted in the slice, and then determine, based on a QoS requirement, which packets are to be transmitted.

S902. The terminal obtains a QoS requirement parameter corresponding to the to-be-transmitted uplink service data of the preset granularity.

Optionally, the terminal obtains, based on the to-be-transmitted uplink service data of the preset granularity and a preset QoS mapping relationship, the QoS requirement parameter corresponding to the to-be-transmitted uplink service data of the preset granularity.

Optionally, the terminal may receive the preset QoS mapping relationship sent by a CN CP or a RAN network element. This is not limited herein.

The preset QoS mapping relationship is generally generated by the CN CP. If the RAN network element sends the preset QoS mapping relationship to the terminal, the RAN network element may first receive the preset QoS mapping relationship sent by the CN CP, and then the RAN network element forwards the preset QoS mapping relationship to the terminal.

If the CN CP directly sends the preset QoS mapping relationship to the terminal, a core network network element may send the preset QoS mapping relationship to the terminal by using a non-access stratum (NAS) message. If the RAN network element forwards the preset QoS mapping relationship to the terminal, the RAN network element may send the preset QoS mapping relationship to the terminal by using an access stratum (AS) message.

Specifically, for the QoS requirement parameter, refer to the foregoing embodiment. Details are not described again herein.

S903. The terminal transmits the to-be-transmitted uplink service data of the preset granularity based on the QoS requirement parameter corresponding to the to-be-transmitted uplink service data of the preset granularity.

Optionally, the preset granularity may be a flow and/or an RB. Specifically, the CN CP may indicate the preset granularity to the terminal, or the preset granularity may be preconfigured. This is not limited herein.

S904. A RAN network element forwards the received to-be-transmitted uplink service data of the preset granularity to a CN UP.

In this embodiment, the terminal obtains the QoS requirement parameter corresponding to the to-be-transmitted uplink service data of the preset granularity, and transmits the to-be-transmitted uplink service data of the preset granularity based on the QoS requirement parameter corresponding to the to-be-transmitted uplink service data of the preset granularity. Different data processing is implemented for to-be-transmitted uplink service data of preset granularities corresponding to different QoS requirement parameters, so that QoS requirements of uplink service data of different preset granularities are satisfied.

Optionally, after the terminal obtains, based on the to-be-transmitted uplink service data of the preset granularity and the preset QoS mapping relationship, the QoS requirement parameter corresponding to the to-be-transmitted uplink service data of the preset granularity, if a plurality of TCP ACKs are recognized in a buffer, all the TCP ACKs except a last ACK are deleted. When the data is transmitted, if free TB space is found, the "deleted TCP ACKs" are uploaded; or if no TB space is free, the "deleted TCP ACKs" are not uploaded.

A network side may configure a QoS threshold. When reporting a buffer status report (BSR), the terminal may indicate a size of a data packet that is greater than a QoS threshold.

For example, a size of a retransmitted data packet is indicated in the BSR.

Further, similar to the embodiment of the RAN network element side, the preset QoS mapping relationship may be in a plurality of forms. For different preset QoS mapping relationships, there are also different methods for obtaining a QoS requirement of the service data by the terminal.

In an implementation, the preset QoS mapping relationship is a preset mapping relationship between feature information and a QoS requirement parameter.

That the terminal obtains, based on the to-be-transmitted uplink service data of the preset granularity and a preset quality of service (QoS) mapping relationship, the QoS requirement parameter corresponding to the to-be-transmitted uplink service data of the preset granularity may be: the terminal recognizes feature information of the uplink service data of the preset granularity, and determines, based on the feature information of the uplink service data of the preset granularity and the preset mapping relationship between the feature information and the QoS requirement parameter, the QoS requirement parameter corresponding to the uplink service data of the preset granularity. To be specific, after obtaining the preset mapping relationship between the feature information and the QoS requirement parameter, the terminal recognizes the feature information of the to-be-transmitted uplink service data of the preset granularity. After recognizing the feature information of the to-be-transmitted uplink service data of the preset granularity, the terminal determines, based on the preset mapping relationship between the feature information and the QoS requirement parameter, the QoS requirement parameter corresponding to the to-be-transmitted uplink service data of the preset granularity.

Optionally, the feature information may include one of the following or any combination thereof: a protocol layer port number, a feature field, an associated feature, and data flow behavior. For detailed explanations about the feature information, refer to the foregoing embodiment. Details are not described again herein.

In another embodiment, the preset QoS mapping relationship is a preset mapping relationship between a QoS identifier and a QoS requirement parameter.

That the terminal obtains, based on the to-be-transmitted uplink service data of the preset granularity and a preset quality of service (QoS) mapping relationship, the QoS requirement parameter corresponding to the to-be-transmitted uplink service data of the preset granularity may be: the terminal obtains a QoS identifier in the to-be-transmitted uplink service data of the preset granularity; and further, the terminal obtains, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Optionally, the terminal may receive identifier configuration information of the service data, sent by an application layer server, and determine the QoS identifier of the to-be-transmitted uplink service data of the preset granularity based on the identifier configuration information of the service data.

The QoS identifier may be carried in a protocol layer header of a service data packet. This is not limited herein.

Further, the terminal determines, based on the QoS identifier in the to-be-transmitted uplink service data of the preset granularity and the preset mapping relationship between the QoS identifier and the QoS requirement parameter, a QoS requirement of the to-be-transmitted uplink service data of the preset granularity.

Optionally, the terminal may further receive enhanced QoS attribute information sent by the RAN network element or the CN CP.

Optionally, the enhanced QoS attribute information includes any one of the following or any combination thereof: a time-varying attribute, a classification attribute, and a granularity attribute. For detailed explanations about the attributes, refer to the foregoing embodiment. Details are not described again herein.

Similar to the foregoing RAN-side network element, the terminal may determine, based on specific content of the enhanced QoS attribute information, whether to perform QoS processing on the to-be-transmitted uplink service data of the preset granularity based on the QoS requirement parameter corresponding to the to-be-transmitted uplink service data of a preset granularity.

In other words, QoS requirement parameters of all services do not need to be determined based on small granularities according to the foregoing method. Whether this action is required may be determined based on a specific attribute. To be specific, when a condition is satisfied, the QoS requirement parameter corresponding to the service data is obtained according to the foregoing method.

Optionally, when the enhanced QoS attribute information includes the time-varying attribute, and the time-varying attribute identifies that the service data is time-varying, that is, a status of the service data changes with time in a service process, and the QoS requirement changes with the service data, the terminal obtains, based on the to-be-transmitted uplink service data of the preset granularity and the preset QoS mapping relationship, the QoS requirement parameter corresponding to the to-be-transmitted uplink service data of the preset granularity.

Optionally, if the enhanced QoS attribute information includes the classification attribute and the classification attribute identifies that QoS requirement classification needs to be performed on the service data, the terminal obtains, based on the to-be-transmitted uplink service data of the preset granularity and the preset QoS mapping relationship, the QoS requirement parameter corresponding to the to-be-transmitted uplink service data of the preset granularity.

Optionally, when the enhanced QoS attribute information includes the granularity attribute and the granularity attribute identifies that a processing granularity is "per bearer" or "flow", the terminal obtains, based on the to-be-transmitted uplink service data of the preset granularity and the preset QoS mapping relationship, the QoS requirement parameter corresponding to the to-be-transmitted uplink service data of the preset granularity.

Optionally, the CN CP may also configure different QoS requirement parameters based on the enhanced QoS attribute information.

When the enhanced QoS attribute information includes the time-varying attribute, the preset QoS mapping relationship includes a mapping relationship between the status of the service data and the QoS requirement parameter. That the terminal obtains, based on the to-be-transmitted uplink service data of the preset granularity and a preset QoS mapping relationship, the QoS requirement parameter corresponding to the to-be-transmitted uplink service data of the preset granularity may be: the terminal obtains a current service status of the to-be-transmitted uplink service data of the preset granularity; and the terminal determines, based on the mapping relationship between the status of the service data and the QoS requirement parameter, a QoS requirement parameter corresponding to the current service status of the to-be-transmitted uplink service data of the preset granularity.

The application layer server may indicate to the terminal that the service status changes.

If the enhanced QoS attribute information includes the classification attribute, the terminal may obtain, based on a preset mechanism, different QoS requirement parameters corresponding to different classified parts of the to-be-transmitted uplink service data of the preset granularity, so as to further perform QoS processing.

Optionally, the preset QoS mapping relationship may include a mapping relationship between a class identifier and a QoS requirement parameter.

That the terminal obtains, based on the to-be-transmitted uplink service data of the preset granularity and a preset QoS mapping relationship, the QoS requirement parameter corresponding to the to-be-transmitted uplink service data of the preset granularity may be: the terminal obtains a class identifier of the to-be-transmitted uplink service data of the preset granularity, and then obtains, based on the mapping relationship between the class identifier and the QoS requirement parameter, a QoS requirement parameter corresponding to each classified part of the to-be-transmitted uplink service data of the preset granularity.

Further, if the enhanced QoS attribute information includes the granularity attribute, the preset QoS mapping relationship may include a mapping relationship between a filter template and a QoS requirement parameter.

That the terminal obtains, based on the to-be-transmitted uplink service data of the preset granularity and a preset QoS mapping relationship, the QoS requirement parameter corresponding to the to-be-transmitted uplink service data of the preset granularity may be: the terminal divides, based on a selected filter template, the service data of the preset granularity into service data of a granularity corresponding to at least one filter template, and obtains, based on a mapping relationship between a filter template and a QoS requirement parameter, a QoS requirement parameter corresponding to the service data of the granularity corresponding to the at least one filter template.

It should be noted that, the enhanced QoS attribute information may change dynamically.

For the embodiment corresponding to the enhanced QoS attribute information, refer to the embodiment of the RAN network element side. Details are not described again herein.

Further, the terminal may perform different QoS processing on different uplink service data by using a plurality of methods. For example, the following several methods may be included. The several solutions may be used in combination based on a specific processing requirement, or may be used independently. This is not limited herein.

1. That the terminal transmits the to-be-transmitted uplink service data of the preset granularity based on the QoS requirement parameter corresponding to the to-be-transmitted uplink service data of the preset granularity may be: the terminal adjusts, based on the QoS requirement parameter corresponding to the to-be-transmitted uplink service data of the preset granularity, a scheduling policy of a logical channel corresponding to the to-be-transmitted uplink service data of the preset granularity, and sends the to-be-transmitted uplink service data of the preset granularity by using the adjusted logical channel. Specifically, the to-be-transmitted uplink service data of the preset granularity may be transmitted to the RAN network element.

In a specific implementation process, if the terminal has a plurality of logical channel groups (LCG), the terminal may determine one of the logical channel groups to adjust a scheduling policy thereof, for example, increase a priority, or increase a transmission rate. This is not limited herein, so long as the adjustment is implemented based on the QoS requirement parameter corresponding to the to-be-transmitted uplink service data of the preset granularity.

If the terminal has only one LCG at the beginning, the terminal needs to send a modification indication message to the RAN network element. For example, the modification indication message is used to indicate that the logical channel requires a BSR of an LCG of a higher priority, or indicate that the logical channel requires a higher transmission rate, or the like. This is not limited herein, so long as the indication is based on the QoS requirement corresponding to the to-be-transmitted uplink service data of the preset granularity. After receiving the modification indication message, the RAN network element knows that the QoS requirement of the LCG changes, and may perform logical channel reconfiguration, for example, add or remove a logical channel, or modify a configuration parameter of the logical channel, or the like. This is not specifically limited herein.

2. That the terminal transmits the to-be-transmitted uplink service data of the preset granularity based on the QoS requirement parameter corresponding to the to-be-transmitted uplink service data of the preset granularity may be: the terminal maps, based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub RB for transmission. To be specific, the uplink service data is mapped to the corresponding RB for transmission to the RAN network element.

Sub RBs correspond to the logical channels on a one-to-one basis.

Before this, the terminal may receive the mapping relationship between the QoS requirement parameter and the sub RB that is sent by the RAN network element. Specifically, the RAN network element may configure different mapping relationships between QoS requirement parameters and sub RBs for the terminal, and send the mapping relationships to the terminal.

After obtaining different to-be-transmitted uplink service data of the preset granularity based on the preset granularity, the terminal maps, based on QoS requirement parameters corresponding to the different to-be-transmitted uplink service data of the preset granularity, the to-be-transmitted uplink service data of the preset granularity to corresponding sub RBs for transmission.

Optionally, the terminal may also map a plurality of pieces of to-be-transmitted uplink service data of the preset granularity with same or similar QoS requirements to a same RB for transmission. Similar QoS requirement parameters may be QoS requirement parameters whose QoS requirement parameter value differences are in a preset range.

In a specific implementation, the preset mapping relationship between the QoS requirement parameter and the sub RB may be a preset mapping relationship between a type of the QoS requirement parameter and the sub RB. To be specific, the RAN network element may classify the QoS requirement parameters, and configure the preset mapping relationship between the type of the QoS requirement parameter and the sub RB. Further, the terminal determines, based on the QoS requirement parameter of the to-be-transmitted uplink service data of the preset granularity, a type of the QoS requirement parameter of the to-be-transmitted uplink service data of the preset granularity, and maps, based on the preset mapping relationship between the type of the QoS requirement parameter and the sub RB, the to-be-transmitted uplink service data of the preset granularity to the corresponding RB for transmission.

For example, a quality of service class identifier (QoS Class Identifier, QCI) may be used to identify a QoS requirement parameter of a preset type. To be specific, to-be-transmitted uplink service data of a preset granularity corresponding to one QCI or several QCIs is mapped to a same sub RB.

In a specific implementation process, if the terminal finds, after obtaining the to-be-transmitted uplink service data of the preset granularity, that the preset mapping relationship between the QoS requirement parameter and the sub RB does not include the sub RB corresponding to the QoS requirement parameter of the to-be-transmitted uplink service data of the preset granularity, the terminal may send a service data classification message to the RAN network element, where the service data classification message includes at least one of the following or any combination thereof: the QoS requirement parameter of the to-be-transmitted uplink service data of the preset granularity, a data flow identifier of the to-be-transmitted uplink service data of the preset granularity, and information instructing to set up a sub RB. After receiving the service data classification message, the RAN network element sets up a new sub RB, configures a mapping relationship between the new sub RB and the QoS requirement parameter, and further sends the mapping relationship between the new sub RB and the QoS requirement parameter to the terminal, so that the terminal maps the to-be-transmitted uplink service data of the preset granularity to the corresponding sub RB.

Optionally, the service data classification message may not carry "information instructing to set up a sub RB"; instead, a sub RB setup request message is specially sent to the RAN network element. After receiving the service data classification message and the sub RB setup request message, the RAN network element sets up a new sub RB, configures a mapping relationship between the new sub RB and the QoS requirement parameter, and further sends the mapping relationship between the new sub RB and the QoS requirement parameter to the terminal.

On a basis of the foregoing embodiment, when detecting that a sub RB corresponding to a first QoS requirement parameter has no data to be transmitted in a preset time period, the terminal may request the RAN network element to release the sub RB corresponding to the first QoS requirement parameter, where the first QoS requirement parameter may be any set of QoS requirement parameters. Alternatively, after all service data on a first sub RB is released, the terminal requests the RAN network element to release the first sub RB, where the first sub RB may be any sub RB.

Optionally, the terminal may instruct the RAN network element, by using control plane signaling, to release the sub RB, for example, instruct the RAN network element, by using an element of RRC message or a Medium Access Control control information (MAC CE) information, to release the sub RB.

Optionally, the terminal may further instruct the AN network element, by using a user plane, to release the sub RB, for example, may add an end marker to a user plane data packet for instructing the RAN network element to release the sub RB and the service data on the sub RB.

Further, for the uplink service data, the sub RB is configured in two manners. One is static configuration. To be specific, the RAN side performs configuration. The RAN knows a QoS requirement parameter of service data of each preset granularity by using the CN CP, and configures parameters for the sub RB by referring to QoS requirement parameters of service data of all preset granularities included in the sub RB. Particularly, a QoS requirement parameter of a classified sub flow may be obtained with reference to data packet header mapping information reported by the terminal and a QoS requirement parameter of a classified data flow notified by the CN CP.

The other is dynamic configuration. The terminal dynamically generates the QoS requirement parameter of the service data of the preset granularity based on the mapping relationship between the service data of the preset granularity and the sub RB. A dynamic configuration rule may be generated and notified by the network side to the terminal. For example, updating may be performed on a basis of the sub RB parameters initially configured by the network side. For example, for a GBR service, a parameter configuration of a PBR of a sub RB may be a sum of GBRs of all classified data sub flows included in the sub RB. For a non PBR service, the network side may configure a PBR generation rule in a unified manner (for example, generate a PBR through calculation based on a QCI). The terminal calculates a PBR of service data of each preset granularity. In this case, a parameter configuration of a PBR of a sub RB may be a sum of PBRs of service data of all preset granularities included in the sub RB.

The terminal executes a data processing program of one or more of encryption, segmentation, reassembly, scheduling, and multiplexing based on the parameter configuration of the uplink sub RB.

3. That the terminal transmits the to-be-transmitted uplink service data of the preset granularity based on the QoS requirement parameter corresponding to the to-be-transmitted uplink service data of the preset granularity may be: the terminal transmits the to-be-transmitted uplink service data of the preset granularity by using a preset processing template corresponding to each protocol layer. Specifically, the to-be-transmitted uplink service data of the preset granularity may be sent to the RAN network element.

Different processing templates correspond to different QoS requirement parameters. The RAN may preconfigure, based on subscription information of the terminal or different QoS requirement parameter information, processing templates corresponding to different protocol layers. Certainly, each protocol layer may correspond to at least one processing template. For example, at least one processing template corresponding to a PDCP layer (each processing template corresponds to a PDCP entity) is configured, and/or at least one processing template corresponding to an RLC layer (each processing template corresponds to an RLC entity) is configured. This is not limited herein.

Before this, the terminal receives a preset correspondence between the processing template and each protocol layer that is sent by the RAN network element, where the processing templates may be distinguished by different template identifiers. Specifically, content of each processing template may be preconfigured in the terminal, or may be dynamically notified by the RAN network element. This is not limited herein.

Certainly, if the terminal finds, after obtaining the QoS requirement of the to-be-transmitted uplink service data of the preset granularity, that a QoS requirement parameter corresponding to a processing template of a current protocol layer does not match the QoS requirement of the to-be-transmitted uplink service data of the preset granularity, the terminal may send a processing template creation request to the RAN network element, requesting the RAN network element to reconfigure a processing template corresponding to each protocol layer. The RAN network element may create a new processing template based on the processing template creation request, for example, create a new PDCP entity, to be specific, a new processing template corresponding to the PDCP entity; and/or create a new RLC entity, to be specific, a new processing template corresponding to the RLC layer. After completion of creation, the RAN notifies the terminal, so that the terminal performs QoS processing on the to-be-transmitted uplink service data of the preset granularity by using the preset processing template corresponding to each protocol layer.

The terminal may further send a processing template deletion request to the RAN network element, where the processing template deletion request may carry an identifier of a to-be-deleted processing template, requesting the RAN network element to delete one or more to-be-deleted processing templates that are currently configured. Optionally, the terminal may further add a cause parameter for requesting deletion and the like to the processing template deletion request.

For example, the terminal may request the RAN network element to delete a processing template that is not used in a preset time period. This is not limited herein.

A header of a data packet of the service data carries an identifier of a PDCP entity and/or an identifier of an RLC entity.

On a basis of the foregoing embodiment, the terminal may release some service data sub flows. For example, if the terminal detects that a time within which there is no data packet of a classed data sub flow is longer than a preset time period, the terminal may instruct the RAN to release the classed data sub flow. The RAN may be instructed by using control plane signaling. The RAN is instructed, by using an RRC message or a MAC CE information element, to release the classed data sub flow. The RAN may be further notified by using a user plane. A user plane data packet carries indication information of an end marker to notify the RAN that the offloaded data sub flow is terminated.

Figure 10:
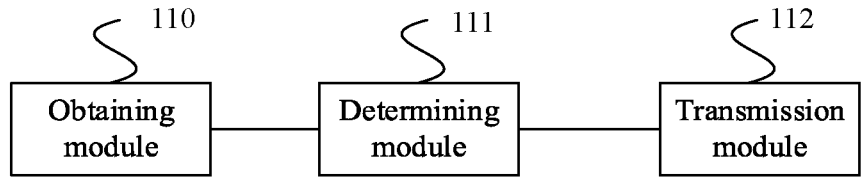
FIG. 10 is a schematic structural diagram of Embodiment 1 of a data transmission apparatus according to the present disclosure.

FIG. 10 is a schematic structural diagram of Embodiment 1 of a data transmission apparatus according to the present disclosure. The apparatus may be integrated in a RAN network element or a RAN controller. As shown in FIG. 10, the apparatus includes an obtaining module 110, a determining module 111, and a transmission module 112.

The obtaining module 110 is configured to obtain service data of a preset granularity.

The determining module 111 is configured to obtain a QoS requirement parameter corresponding to the service data of the preset granularity, perform QoS requirement classification on the service data of the preset granularity, and determine, based on the QoS requirement parameter corresponding to the service data of the preset granularity, a QoS requirement parameter corresponding to a class of the service data of the preset granularity.

The transmission module 112 is configured to transmit the service data of the preset granularity based on the class of the service data of the preset granularity.

In this embodiment, the RAN network element obtains the service data of the preset granularity; further, the RAN network element obtains the QoS requirement parameter corresponding to the service data of the preset granularity, performs QoS requirement classification on the service data of the preset granularity, and determines the QoS requirement parameter corresponding to the class of the service data of the preset granularity; and further, the RAN network element transmits the service data of the preset granularity based on the class of the service data of the preset granularity. Therefore, the RAN network element can learn different QoS requirement parameters corresponding to service data of different preset granularities, and transmit the service data of the preset granularities separately based on classes of the service data of the preset granularities, to satisfy QoS requirements of the service data of different preset granularities.

The determining module 111 is specifically configured to obtain, based on attribute information of the service data of the preset granularity and a preset quality of service (QoS) mapping relationship, the QoS requirement parameter corresponding to the service data of the preset granularity.

The attribute information of the service data of the preset granularity includes any one of the following or any combination thereof: preset feature information, a preset identifier, and a preset channel identifier.

Optionally, the preset quality of service (QoS) mapping relationship is a preset mapping relationship between feature information and a QoS requirement parameter; and the determining module 111 is specifically configured to recognize feature information of the service data of the preset granularity, and obtain, based on the feature information of the service data of the preset granularity and the preset mapping relationship between the feature information and the QoS requirement parameter, the QoS requirement parameter corresponding to the service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset quality of service (QoS) mapping relationship is a preset mapping relationship between a QoS identifier and a QoS requirement parameter; and the determining module 111 is specifically configured to obtain a QoS identifier in the service data of the preset granularity based on a preset rule, and obtain, based on the QoS identifier in the service data of the preset granularity and the preset mapping relationship between the QoS identifier and the QoS requirement parameter, the QoS requirement parameter corresponding to the service data of the preset granularity.

Optionally, that the determining module 111 is configured to obtain a QoS identifier in the service data of the preset granularity based on a preset rule is specifically: obtaining the QoS identifier from a header of a data packet of the service data of the preset granularity based on the preset rule.

Optionally, the preset quality of service (QoS) mapping relationship is a preset mapping relationship between a channel identifier and a QoS requirement parameter; and the determining module 111 is specifically configured to determine a channel for receiving the service data of the preset granularity, and obtain, based on the channel for receiving the service data of the preset granularity and the preset mapping relationship between the channel identifier and the QoS requirement parameter, the QoS requirement parameter corresponding to the service data of the preset granularity.

Optionally, the QoS requirement parameter includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Figure 11:
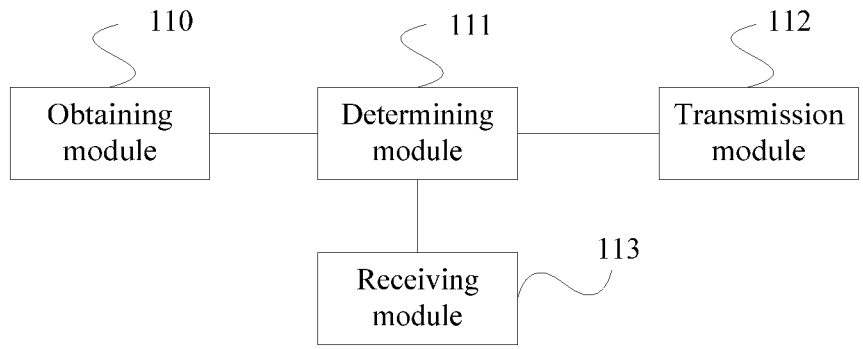
FIG. 11 is a schematic structural diagram of Embodiment 2 of a data transmission apparatus according to the present disclosure.

FIG. 11 is a schematic structural diagram of Embodiment 2 of a data transmission apparatus according to the present disclosure. As shown in FIG. 11, on a basis of FIG. 10, the apparatus further includes a receiving module 113, configured to receive and obtain enhanced QoS attribute information.

The determining module 111 is specifically configured to obtain, based on enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, when the enhanced QoS attribute information includes the time-varying attribute, the preset QoS mapping relationship includes a mapping relationship between the status of the service data and the QoS requirement parameter; and the determining module 111 is specifically configured to obtain a current service status of the service data of the preset granularity, and determine, based on the current service status of the service data of the preset granularity and the mapping relationship between the status of the service data and the QoS requirement parameter, a QoS requirement parameter corresponding to the current service status of the service data of the preset granularity.

Optionally, the receiving module 113 is further configured to receive a service status change notification sent by an application layer server; and the determining module 111 is further configured to determine the current service status of the service data of the preset granularity based on the service status change notification.

The transmission module 112 is specifically configured to use the QoS requirement parameter corresponding to the class of the service data of the preset granularity as an input for Medium Access Control MAC layer scheduling, and transmit the service data of the preset granularity through MAC layer scheduling.

Figure 12:
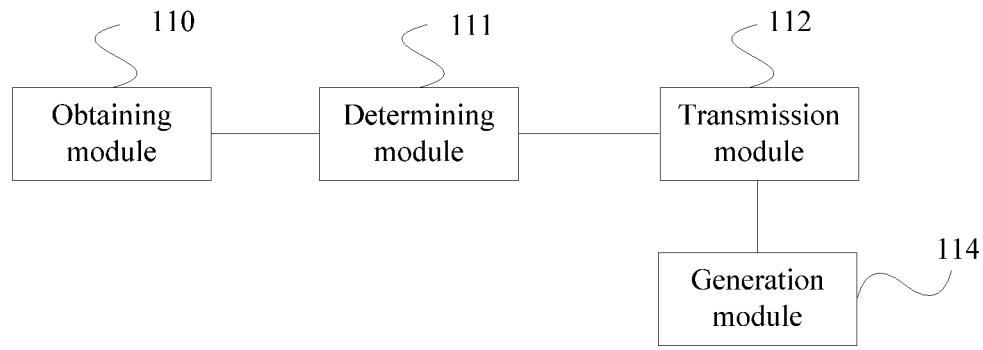
FIG. 12 is a schematic structural diagram of Embodiment 3 of a data transmission apparatus according to the present disclosure.

FIG. 12 is a schematic structural diagram of Embodiment 3 of a data transmission apparatus according to the present disclosure. As shown in FIG. 12, on a basis of FIG. 10, the apparatus further includes a generation module 114, configured to generate a plurality of sub radio bearers, where each sub radio bearer corresponds to different QoS requirement parameters.

The transmission module 112 is specifically configured to select, based on the QoS requirement parameter corresponding to the class of the service data of the preset granularity and a mapping relationship between a sub radio bearer and a QoS requirement parameter, a corresponding sub radio bearer for transmitting the service data of the preset granularity.

Optionally, the transmission module 112 is specifically configured to select, based on the QoS requirement parameter corresponding to the class of the service data of the preset granularity, a processing template used by each protocol layer, where different processing templates correspond to different QoS requirement parameters; and transmit the service data of the preset granularity based on the processing template used by each protocol layer.

Optionally, the obtaining module 110 is further configured to obtain the preset QoS mapping relationship.

Optionally, the transmission module 112 is further configured to send the preset QoS mapping relationship to a terminal.

Figure 13:
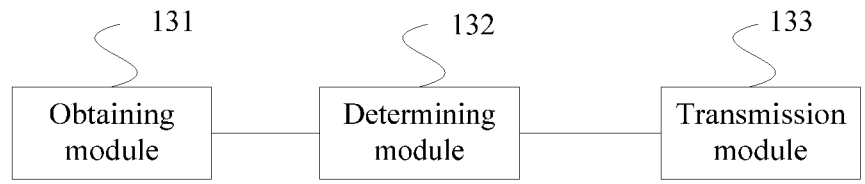
FIG. 13 is a schematic structural diagram of Embodiment 4 of a data transmission apparatus according to the present disclosure.

FIG. 13 is a schematic structural diagram of Embodiment 4 of a data transmission apparatus according to the present disclosure. The apparatus may be integrated in a terminal. The apparatus includes an obtaining module 131, a determining module 132, and a transmission module 133.

The obtaining module 131 is configured to obtain to-be-transmitted uplink service data of a preset granularity.

The determining module 132 is configured to obtain a QoS requirement parameter corresponding to the to-be-transmitted uplink service data of the preset granularity.

The transmission module 133 is configured to transmit the to-be-transmitted uplink service data of the preset granularity based on the QoS requirement parameter corresponding to the to-be-transmitted uplink service data of the preset granularity.

Optionally, the determining module 132 is specifically configured to obtain, based on the to-be-transmitted uplink service data of the preset granularity and a preset quality of service (QoS) mapping relationship, the QoS requirement parameter corresponding to the to-be-transmitted uplink service data of the preset granularity.

Optionally, the preset quality of service (QoS) mapping relationship is a preset mapping relationship between feature information and a QoS requirement parameter; and the determining module 132 is specifically configured to recognize feature information of the to-be-transmitted uplink service data of the preset granularity, and obtain, based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset QoS mapping relationship is a preset mapping relationship between a QoS identifier and a QoS requirement parameter; and the determining module 132 is specifically configured to obtain a QoS identifier in the to-be-transmitted uplink service data of the preset granularity, and obtain, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Optionally, the QoS requirement includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Figure 14:
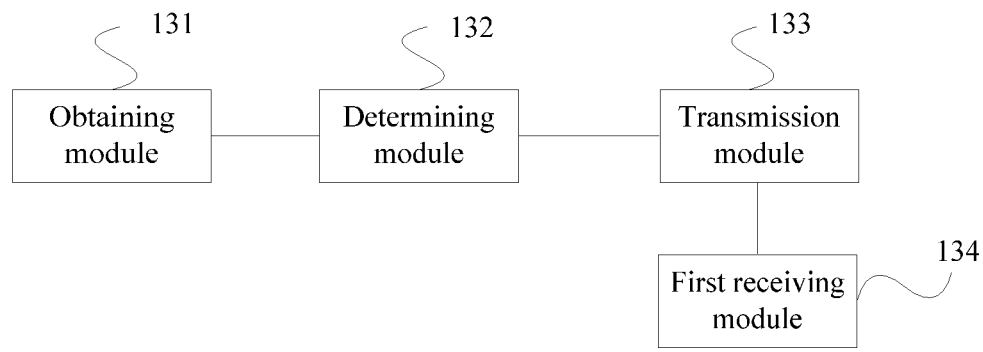
FIG. 14 is a schematic structural diagram of Embodiment 5 of a data transmission apparatus according to the present disclosure.

FIG. 14 is a schematic structural diagram of Embodiment 5 of a data transmission apparatus according to the present disclosure. On a basis of FIG. 13, the apparatus may further include a first receiving module 134, configured to receive enhanced QoS attribute information sent by a core network control function entity or a RAN network element.

The determining module 132 is specifically configured to obtain, based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, the transmission module 133 is specifically configured to adjust, based on the QoS requirement parameter corresponding to the to-be-transmitted uplink service data of the preset granularity, a scheduling policy of a logical channel corresponding to the to-be-transmitted uplink service data of the preset granularity, and transmit the to-be-transmitted uplink service data of the preset granularity to a RAN network element by using the adjusted logical channel.

Optionally, the transmission module 133 is specifically configured to map, based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission.

Figure 15:
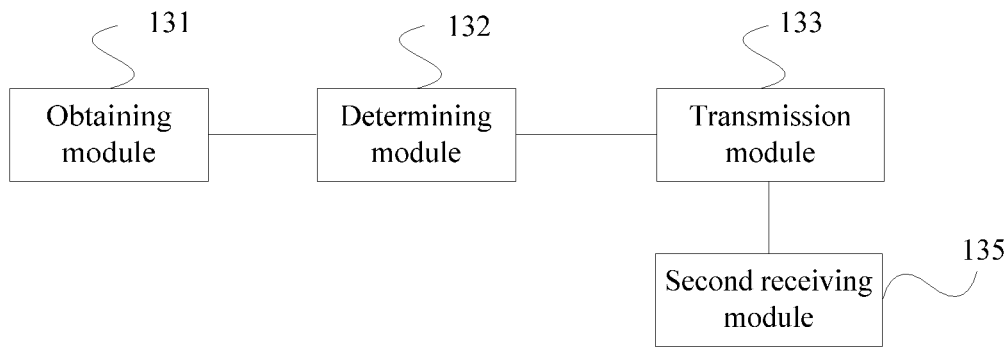
FIG. 15 is a schematic structural diagram of Embodiment 6 of a data transmission apparatus according to the present disclosure.

FIG. 15 is a schematic structural diagram of Embodiment 6 of a data transmission apparatus according to the present disclosure. On a basis of FIG. 13, the apparatus may further include a second receiving module 135, configured to receive the preset mapping relationship between the QoS requirement and the sub RB that is sent by the RAN network element.

The transmission module 133 is specifically configured to perform QoS processing on the to-be-transmitted uplink service data of the preset granularity by using a preset processing template corresponding to each protocol layer, and send the processed to-be-transmitted uplink service data of the preset granularity to a RAN network element.

Figure 16:
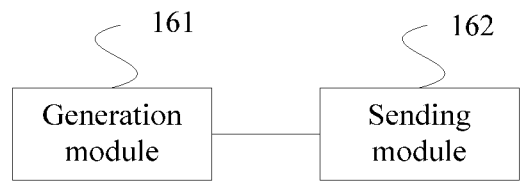
FIG. 16 is a schematic structural diagram of Embodiment 7 of a data transmission apparatus according to the present disclosure.

FIG. 16 is a schematic structural diagram of Embodiment 7 of a data transmission apparatus according to the present disclosure. The apparatus may be integrated in a core network network element. As shown in FIG. 16, the apparatus includes a generation module 161 and a sending module 162.

The generation module 161 is configured to generate a quality of service (QoS) mapping relationship, where the QoS mapping relationship is used to indicate a mapping relationship between service data of a preset granularity and a QoS requirement parameter.

The sending module 162 is configured to send the QoS mapping relationship to a radio access network network element.

Optionally, the sending module 162 is further configured to send the QoS mapping relationship to a terminal.

Optionally, the QoS mapping relationship includes a mapping relationship between service data feature information and a QoS requirement.

The service data feature information includes one of the following or any combination thereof: a protocol layer port number, a feature field, an associated feature, and data flow behavior, where the associated feature indicates a plurality of feature fields that are jointly recognized.

Optionally, the QoS mapping relationship includes a mapping relationship between a QoS identifier in service data and a QoS requirement parameter.

Optionally, the QoS mapping relationship includes a preset mapping relationship between a channel identifier and a QoS requirement parameter.

Optionally, the sending module 162 is further configured to send at least one set of QoS requirement parameters to a core network user plane function entity.

The apparatus is configured to perform the foregoing method embodiment. Implementation principles and technical effects thereof are similar.

Figure 17:
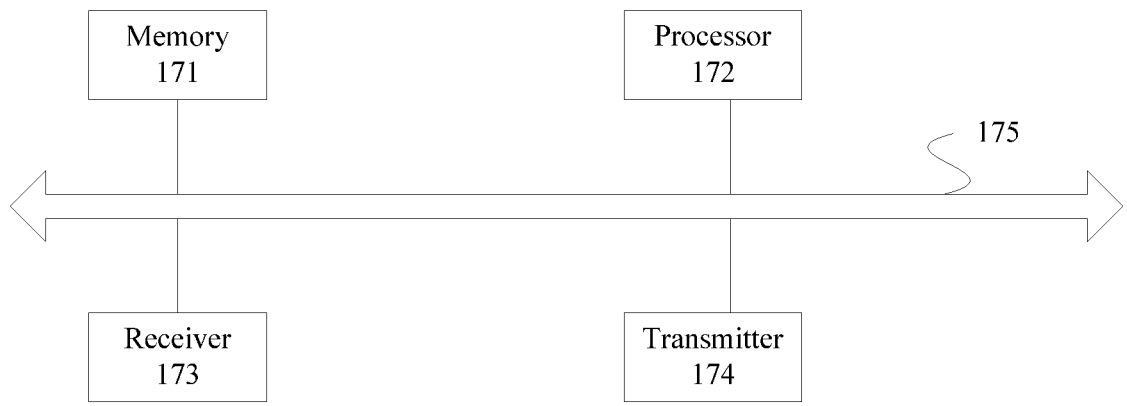
FIG. 17 is a schematic structural diagram of Embodiment 1 of a radio access network network element according to the present disclosure.

FIG. 17 is a schematic structural diagram of Embodiment 1 of a radio access network network element according to the present disclosure. As shown in FIG. 17, the RAN network element includes a memory 171, a processor 172, a receiver 173, and a transmitter 174.

The memory 171, the processor 172, the receiver 173, and the transmitter 174 are connected by a bus 175.

The memory 171 is configured to store an instruction, and the processor 172 is configured to invoke the instruction in the memory 171 to perform the foregoing method embodiment. Specifically, the processor 172 is configured to obtain service data of a preset granularity, obtain a QoS requirement parameter corresponding to the service data of the preset granularity, perform QoS requirement classification on the service data of the preset granularity, determine, based on the QoS requirement parameter corresponding to the service data of the preset granularity, a QoS requirement parameter corresponding to a class of the service data of the preset granularity, and transmit the service data of the preset granularity based on the class of the service data of the preset granularity.

The processor 172 is specifically configured to obtain, based on attribute information of the service data of the preset granularity and a preset quality of service (QoS) mapping relationship, the QoS requirement parameter corresponding to the service data of the preset granularity.

The attribute information of the service data of the preset granularity includes any one of the following or any combination thereof: preset feature information, a preset identifier, and a preset channel identifier.

Optionally, the preset quality of service (QoS) mapping relationship is a preset mapping relationship between feature information and a QoS requirement parameter; and the processor 172 is specifically configured to recognize feature information of the service data of the preset granularity, and obtain, based on the feature information of the service data of the preset granularity and the preset mapping relationship between the feature information and the QoS requirement parameter, the QoS requirement parameter corresponding to the service data of the preset granularity.

The feature information includes one of the following or any combination thereof: a protocol layer port number, a feature field, an associated feature, and data flow behavior, where the associated feature indicates a plurality of feature fields that are jointly recognized.

Optionally, the preset quality of service (QoS) mapping relationship is a preset mapping relationship between a QoS identifier and a QoS requirement parameter; and the processor 172 is specifically configured to obtain a QoS identifier in the service data of the preset granularity based on a preset rule, and obtain, based on the QoS identifier in the service data of the preset granularity and the preset mapping relationship between the QoS identifier and the QoS requirement parameter, the QoS requirement parameter corresponding to the service data of the preset granularity.

Optionally, that the processor 172 is configured to obtain a QoS identifier in the service data of the preset granularity based on a preset rule is specifically: obtaining the QoS identifier from a header of a data packet of the service data of the preset granularity based on the preset rule.

Optionally, the preset quality of service (QoS) mapping relationship is a preset mapping relationship between a channel identifier and a QoS requirement parameter; and the processor 172 is specifically configured to determine a channel for receiving the service data of the preset granularity, and obtain, based on the channel for receiving the service data of the preset granularity and the preset mapping relationship between the channel identifier and the QoS requirement parameter, the QoS requirement parameter corresponding to the service data of the preset granularity.

Optionally, the QoS requirement includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the receiver 173 is configured to receive and obtain enhanced QoS attribute information; and the processor 172 is specifically configured to obtain, based on enhanced QoS attribute information of the service data of the preset granularity and the preset QoS mapping relationship, the QoS requirement parameter corresponding to the service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, when the enhanced QoS attribute information includes the time-varying attribute, the preset QoS mapping relationship includes a mapping relationship between the status of the service data and the QoS requirement parameter; and the processor 172 is specifically configured to obtain a current service status of the service data of the preset granularity, and determine, based on the current service status of the service data of the preset granularity and the mapping relationship between the status of the service data and the QoS requirement parameter, a QoS requirement parameter corresponding to the current service status of the service data of the preset granularity.

Optionally, the receiver 173 is further configured to receive a service status change notification sent by an application layer server; and the processor 172 is further configured to determine the current service status of the service data of the preset granularity based on the service status change notification.

Optionally, the processor 172 is specifically configured to use the QoS requirement parameter corresponding to the class of the service data of the preset granularity as an input for Medium Access Control MAC layer scheduling, and transmit the service data of the preset granularity through MAC layer scheduling.

Optionally, the processor 172 is further configured to generate a plurality of sub radio bearers, where each sub radio bearer corresponds to different QoS requirement parameters; and select, based on the QoS requirement parameter corresponding to the class of the service data of the preset granularity and a mapping relationship between a sub radio bearer and a QoS requirement parameter, a corresponding sub radio bearer for transmitting the service data of the preset granularity.

Optionally, the processor 172 is specifically configured to select, based on the QoS requirement parameter corresponding to the class of the service data of the preset granularity, a processing template used by each protocol layer, where different processing templates correspond to different QoS requirement parameters; and transmit the service data of the preset granularity based on the processing template used by each protocol layer.

Optionally, the processor 172 is further configured to obtain the preset QoS mapping relationship.

Optionally, the transmitter 174 is configured to send the preset QoS mapping relationship to a terminal.

Figure 18:
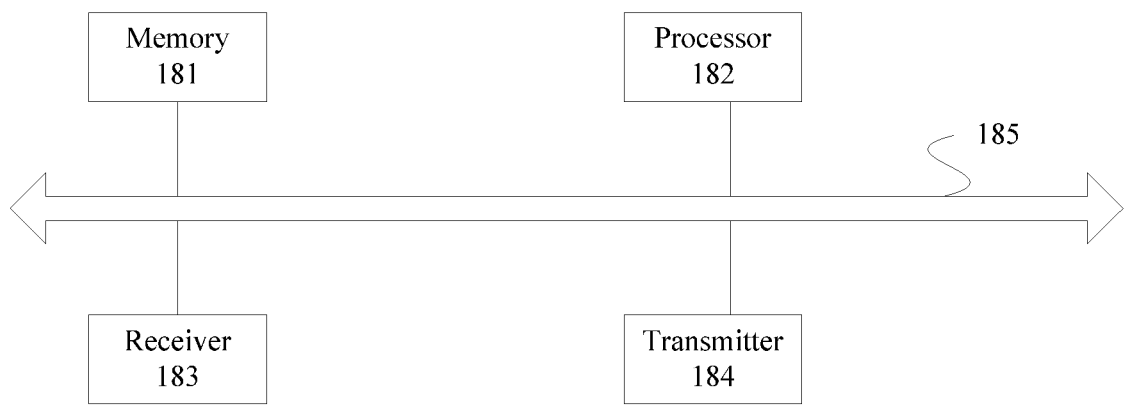
FIG. 18 is a schematic structural diagram of Embodiment 1 of a terminal according to the present disclosure.

FIG. 18 is a schematic structural diagram of Embodiment 1 of a terminal according to the present disclosure. As shown in FIG. 18, the terminal includes a memory 181, a processor 182, a receiver 183, and a transmitter 184.

The memory 181, the processor 182, the receiver 183, and the transmitter 184 are connected by a bus 185.

The memory 181 is configured to store an instruction, and the processor 182 is configured to invoke the instruction in the memory 181 to perform the foregoing method embodiment.

Specifically, the processor 182 is configured to obtain to-be-transmitted uplink service data of a preset granularity, obtain a QoS requirement parameter corresponding to the to-be-transmitted uplink service data of the preset granularity, and transmit the to-be-transmitted uplink service data of the preset granularity based on the QoS requirement parameter corresponding to the to-be-transmitted uplink service data of the preset granularity.

Optionally, the processor 182 is specifically configured to obtain, based on the to-be-transmitted uplink service data of the preset granularity and a preset quality of service (QoS) mapping relationship, the QoS requirement parameter corresponding to the to-be-transmitted uplink service data of the preset granularity.

Optionally, the preset quality of service (QoS) mapping relationship is a preset mapping relationship between feature information and a QoS requirement parameter; and the processor 182 is specifically configured to recognize feature information of the to-be-transmitted uplink service data of the preset granularity, and obtain, based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

Optionally, the feature information includes one of the following or any combination thereof: a protocol layer port number, a feature field, an associated feature, and data flow behavior, where the associated feature indicates a plurality of feature fields that are jointly recognized.

Optionally, the preset QoS mapping relationship is a preset mapping relationship between a QoS identifier and a QoS requirement parameter; and the processor 182 is specifically configured to obtain a QoS identifier in the to-be-transmitted uplink service data of the preset granularity, and obtain, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

Further, the QoS requirement parameter includes at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

Optionally, the receiver 183 is configured to receive enhanced QoS attribute information sent by a core network control function entity or a RAN network element; and the processor 182 is specifically configured to obtain, based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

Optionally, the enhanced QoS attribute information includes any one of the following or any combination thereof: a time-varying attribute, a classification attribute, and a granularity attribute, where the time-varying attribute is used to identify whether a status of the service data changes with time in a service process and whether the QoS requirement parameter changes with the status of the service data, the classification attribute is used to identify whether the service data is classified based on the QoS requirement parameter, and the granularity attribute is used to identify a QoS processing granularity.

Optionally, the processor 182 adjusts, based on the QoS requirement parameter corresponding to the to-be-transmitted uplink service data of the preset granularity, a scheduling policy of a logical channel corresponding to the to-be-transmitted uplink service data of the preset granularity, and transmits the to-be-transmitted uplink service data of the preset granularity to a RAN network element by using the adjusted logical channel.

Optionally, the processor 182 is specifically configured to map, based on the QoS requirement parameter corresponding to the to-be-transmitted uplink service data of the preset granularity and a preset mapping relationship between a QoS requirement parameter and a sub RB, the to-be-transmitted uplink service data of the preset granularity to a corresponding sub radio bearer (RB) for transmission.

Optionally, the receiver 183 is configured to receive the preset mapping relationship between the QoS requirement and the sub RB that is sent by the RAN network element.

Optionally, the processor 182 is specifically configured to perform QoS processing on the to-be-transmitted uplink service data of the preset granularity by using a preset processing template corresponding to each protocol layer, and send the processed to-be-transmitted uplink service data of the preset granularity to a RAN network element.

Figure 19:
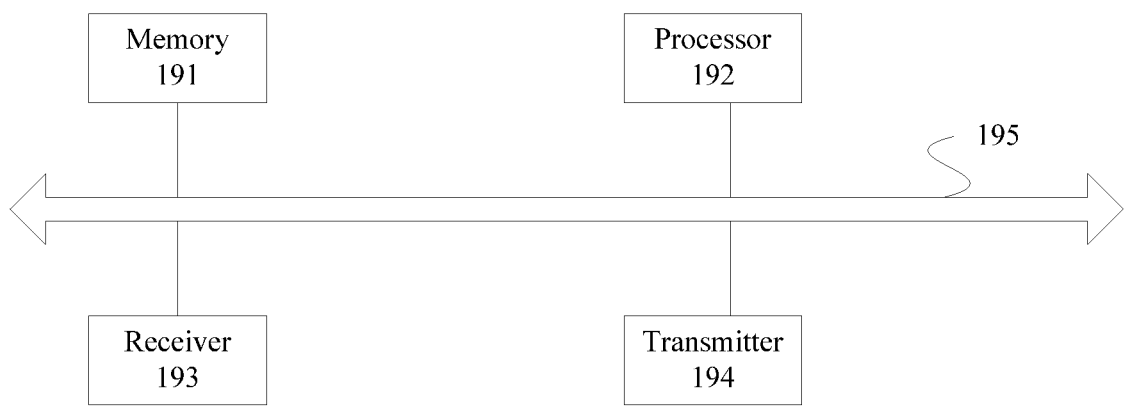
FIG. 19 is a schematic structural diagram of Embodiment 1 of a core network network element according to the present disclosure.

FIG. 19 is a schematic structural diagram of Embodiment 1 of a core network network element according to the present disclosure. As shown in FIG. 19, the core network network element includes a memory 191, a processor 192, a receiver 193, and a transmitter 194.

The memory 191, the processor 192, the receiver 193, and the transmitter 194 are connected by a bus 195.

The memory 191 is configured to store an instruction, and the processor 192 is configured to invoke the instruction in the memory 191 to perform the foregoing method embodiment.

Specifically, the processor 192 is configured to generate a quality of service (QoS) mapping relationship, where the QoS mapping relationship is used to indicate a mapping relationship between service data of a preset granularity and a QoS requirement parameter.

The transmitter 194 is configured to send the QoS mapping relationship to a radio access network network element.

Optionally, the transmitter 194 is further configured to send the QoS mapping relationship to the radio access network network element.

Optionally, the QoS mapping relationship includes a mapping relationship between service data feature information and a QoS requirement.

Optionally, the feature information includes one of the following or any combination thereof: a protocol layer port number, a feature field, an associated feature, and data flow behavior, where the associated feature indicates a plurality of feature fields that are jointly recognized.

Optionally, the QoS mapping relationship includes a mapping relationship between a QoS identifier in service data and a QoS requirement parameter.

Optionally, the preset quality of service (QoS) mapping relationship is a preset mapping relationship between a channel identifier and a QoS requirement parameter.

Optionally, the transmitter 194 is further configured to send at least one set of QoS requirement parameters to a core network user plane function entity.

The apparatus is configured to perform the foregoing method embodiment. Implementation principles and technical effects thereof are similar. For details, refer to the foregoing method embodiment.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
obtaining, by a terminal, to-be-transmitted uplink service data of a preset granularity;
receiving, by the terminal, enhanced quality of service (QoS) attribute information sent by a core network control function entity or a radio access network (RAN) network element, the enhanced QoS attribute information comprising a granularity attribute identifying a QoS processing granularity; and
in response to determining that the QoS processing granularity identified by the granularity attribute is a per bearer or a per flow granularity:
obtaining, by the terminal, a QoS requirement parameter corresponding to the to-be-transmitted uplink service data of the preset granularity; and
transmitting, by the terminal, the to-be-transmitted uplink service data of the preset granularity based on the QoS requirement parameter corresponding to the to-be-transmitted uplink service data of the preset granularity.

2. The method according to claim 1, wherein the obtaining, by the terminal, a QoS requirement parameter corresponding to the to-be-transmitted uplink service data of the preset granularity comprises:
obtaining, by the terminal based on the to-be-transmitted uplink service data of the preset granularity and a preset QoS mapping relationship, the QoS requirement parameter corresponding to the to-be-transmitted uplink service data of the preset granularity.

3. The method according to claim 2, wherein the preset QoS mapping relationship is a preset mapping relationship between feature information and a QoS requirement parameter; and
the obtaining, by the terminal based on the to-be-transmitted uplink service data of the preset granularity and a preset QoS mapping relationship, the QoS requirement parameter corresponding to the to-be-transmitted uplink service data of the preset granularity comprises:
recognizing, by the terminal, feature information of the to-be-transmitted uplink service data of the preset granularity; and
obtaining, by the terminal based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

4. The method according to claim 3, wherein the feature information comprises one of the following or any combination thereof: a protocol port number, a feature field, an associated feature, and data flow behavior, wherein the associated feature indicates a plurality of feature fields that are jointly recognized.

5. The method according to claim 2, wherein the preset QoS mapping relationship is a preset mapping relationship between a QoS identifier and a QoS requirement parameter; and
the obtaining, by the terminal based on the to-be-transmitted uplink service data of the preset granularity and a preset QoS mapping relationship, the QoS requirement parameter corresponding to the to-be-transmitted uplink service data of the preset granularity comprises:
obtaining, by the terminal, a QoS identifier in the to-be-transmitted uplink service data of the preset granularity; and
obtaining, by the terminal based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

6. The method according to claim 2, wherein
the obtaining, by the terminal, a QoS requirement parameter corresponding to the to-be-transmitted uplink service data of the preset granularity comprises:
obtaining, by the terminal based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

7. The method according to claim 6, wherein the enhanced QoS attribute information further comprises any one of the following or any combination thereof: a time-varying attribute or a classification attribute, wherein
the time-varying attribute is used to identify whether a status of the service data changes with time in a service process and whether the QoS requirement parameter changes with the status of the service data, and the classification attribute is used to identify whether the service data is classified based on the QoS requirement parameter.

8. The method according to claim 2, wherein the transmitting, by the terminal, the to-be-transmitted uplink service data of the preset granularity based on the QoS requirement parameter corresponding to the to-be-transmitted uplink service data of the preset granularity comprises:
adjusting, by the terminal based on the QoS requirement parameter corresponding to the to-be-transmitted uplink service data of the preset granularity, a scheduling policy of a logical channel corresponding to the to-be-transmitted uplink service data of the preset granularity, and transmitting the to-be-transmitted uplink service data of the preset granularity to a radio access network (RAN) network element by using the adjusted scheduling policy of the logical channel.

9. The method according to claim 2, wherein the transmitting, by the terminal, the to-be-transmitted uplink service data of the preset granularity based on the QoS requirement parameter corresponding to the to-be-transmitted uplink service data of the preset granularity comprises:
mapping, by the terminal based on the QoS requirement parameter corresponding to the to-be-transmitted uplink service data of the preset granularity and a preset mapping relationship between a QoS requirement parameter and a sub radio bearer (RB), the to-be-transmitted uplink service data of the preset granularity to a corresponding sub RB for transmission.

10. The method according to claim 1, wherein the QoS requirement parameter comprises at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

11. A data transmission apparatus, comprising:
a transceiver, configured to obtain to-be-transmitted uplink service data of a preset granularity;
the transceiver, further configured to receive enhanced quality of service (QoS) attributes information sent by a core network control function entity or a radio access network (RAN) network element, the enhanced QoS attribute information comprising a granularity attribute identifying a QoS processing granularity; and
a processor,
wherein in response to the processor determining that the QoS processing granularity identified by the granularity attribute is a per bearer or a per follow granularity:
the processor is further configured to obtain a QoS requirement parameter corresponding to the to-be-transmitted uplink service data of the preset granularity; and
the transceiver is further configured to transmit the to-be-transmitted uplink service data of the preset granularity based on the QoS requirement parameter corresponding to the to-be-transmitted uplink service data of the preset granularity.

12. The apparatus according to claim 11, wherein the processor is configured to obtain, based on the to-be-transmitted uplink service data of the preset granularity and a preset QoS mapping relationship, the QoS requirement parameter corresponding to the to-be-transmitted uplink service data of the preset granularity.

13. The apparatus according to claim 12, wherein the preset QoS mapping relationship is a preset mapping relationship between feature information and a QoS requirement parameter; and
the processor is configured to recognize feature information of the to-be-transmitted uplink service data of the preset granularity, and obtain, based on the feature information of the to-be-transmitted uplink service data of the preset granularity and the preset mapping relationship between the feature information and the QoS requirement parameter, the QoS requirement parameter corresponding to the to-be-transmitted uplink service data of the preset granularity.

14. The apparatus according to claim 13, wherein the feature information comprises one of the following or any combination thereof: a protocol layer port number, a feature field, an associated feature, and data flow behavior, wherein the associated feature indicates a plurality of feature fields that are jointly recognized.

15. The apparatus according to claim 12, wherein the preset QoS mapping relationship is a preset mapping relationship between a QoS identifier and a QoS requirement parameter; and
the processor is configured to obtain a QoS identifier in the to-be-transmitted uplink service data of the preset granularity, and obtain, based on the QoS identifier in the to-be-transmitted uplink service data of the preset granularity and the preset mapping relationship between the QoS identifier and the QoS requirement parameter, the QoS requirement parameter corresponding to the to-be-transmitted uplink service data of the preset granularity.

16. The apparatus according to claim 12, wherein
the processor is configured to obtain, based on enhanced QoS attribute information corresponding to the to-be-transmitted uplink service data of the preset granularity and the preset QoS mapping relationship, the QoS requirement parameter corresponding to the to-be-transmitted uplink service data of the preset granularity.

17. The apparatus according to claim 16, wherein the enhanced QoS attribute information further comprises any one of the following or any combination thereof: a time-varying attribute or a classification attribute, wherein
the time-varying attribute is used to identify whether a status of the service data changes with time in a service process and whether the QoS requirement parameter changes with the status of the service data, and the classification attribute is used to identify whether the service data is classified based on the QoS requirement parameter.

18. The apparatus according to claim 12 wherein the processor is configured to adjust, based on the QoS requirement parameter corresponding to the to-be-transmitted uplink service data of the preset granularity, a scheduling policy of a logical channel corresponding to the to-be-transmitted uplink service data of the preset granularity, and transmit the to-be-transmitted uplink service data of the preset granularity to a radio access network (RAN) network element by using the adjusted logical channel.

19. The apparatus according to claim 12, wherein the transceiver is configured to map, based on the QoS requirement parameter corresponding to the to-be-transmitted uplink service data of the preset granularity and a preset mapping relationship between a QoS requirement parameter and a sub radio bearer (RB), the to-be-transmitted uplink service data of the preset granularity to a corresponding sub RB for transmission.

20. The apparatus according to claim 11, wherein the QoS requirement parameter comprises at least one of the following or any combination thereof: a flow aggregate maximum bit rate (AMBR), a radio bearer AMBR, a terminal AMBR, a priority, a time delay, a packet loss rate, a handover feature, a time-varying feature, and an allocation and retention priority (ARP).

* * * * *

UNITED STATES PATENT AND TRADEMARK OFFICE
CERTIFICATE OF CORRECTION

PATENT NO. : 10,721,754 B2  
APPLICATION NO. : 16/198720  
DATED : July 21, 2020  
INVENTOR(S) : Lifeng Han et al.

It is certified that error appears in the above-identified patent and that said Letters Patent is hereby corrected as shown below:

In the Claims

In Claim 11, Column 55, Line 5, "attributes" should be --attribute--.

In Claim 11, Column 55, Line 13, "follow" should be --flow--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*